(12) United States Patent
Takashima et al.

(10) Patent No.: US 9,428,667 B2
(45) Date of Patent: Aug. 30, 2016

(54) MEMBER FOR VEHICLE AND MANUFACTURING PROCESS FOR THE SAME

(75) Inventors: Hiroaki Takashima, Kariya (JP); Kyoko Kumagai, Kariya (JP); Hidetaka Hayashi, Kariya (JP); Tetsuya Mitsuoka, Kariya (JP); Naoharu Ueda, Kariya (JP); Hisashi Muramatsu, Kariya (JP); Kazumasa Inata, Nagoya (JP); Takeshi Fujita, Nagoya (JP); Yasuyuki Sanai, Nagoya (JP); Eiichi Okazaki, Nagoya (JP); Satoshi Yoneda, Nagoya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 21 days.

(21) Appl. No.: 14/343,332

(22) PCT Filed: Aug. 27, 2012

(86) PCT No.: PCT/JP2012/005353
§ 371 (c)(1),
(2), (4) Date: Mar. 6, 2014

(87) PCT Pub. No.: WO2013/035262
PCT Pub. Date: Mar. 14, 2013

(65) Prior Publication Data
US 2014/0242395 A1    Aug. 28, 2014

(30) Foreign Application Priority Data

Sep. 6, 2011 (JP) .................. 2011-194304

(51) Int. Cl.
*C09D 147/00* (2006.01)
*C09D 7/12* (2006.01)
*C08G 18/67* (2006.01)
*C08G 18/79* (2006.01)
*C08J 7/04* (2006.01)

(52) U.S. Cl.
CPC ............ *C09D 147/00* (2013.01); *C08G 18/672* (2013.01); *C08G 18/792* (2013.01); *C08J 7/047* (2013.01); *C09D 7/125* (2013.01); *C08J 2369/00* (2013.01); *C08J 2475/16* (2013.01); *C08J 2483/06* (2013.01); *Y10T 428/31551* (2015.04)

(58) Field of Classification Search
CPC ....... C09D 7/125; C09D 147/00; C08J 7/047; C08J 2369/00; C08J 2483/06; C08J 2475/16; Y10T 428/31551
USPC ......................................... 428/423.1; 427/387
See application file for complete search history.

(56) References Cited

U.S. PATENT DOCUMENTS 6,306,502 B1    10/2001  Fukushima et al.
2011/0319582 A1*  12/2011  Inata et al. .................. 526/262

FOREIGN PATENT DOCUMENTS

| EP | 0869154 A1 | 10/1998 |
|---|---|---|
| EP | 2371871 A1 | 10/2011 |
| JP | 02-129235 A | 5/1990 |
| JP | 2000-063701 A | 2/2000 |
| JP | 2000-273128 A | 10/2000 |
| JP | 2001-214122 A | 8/2001 |
| JP | 2002-038058 A | 2/2002 |
| JP | 3747065 B2 | 2/2006 |
| JP | 2010-254840 A | 11/2010 |
| JP | 2011-088054 A | 5/2011 |
| JP | 2011-256343 A | 12/2011 |
| JP | 2011-256344 A | 12/2011 |
| JP | 2011256344 A * | 12/2011 |
| WO | 97/11129 A1 | 3/1997 |
| WO | 2009/054508 A1 | 4/2009 |
| WO | 2010067876 A1 | 6/2010 |
| WO | 2011/048775 A1 | 4/2011 |
| WO | 2011/048776 A1 | 4/2011 |
| WO | 2011/155138 A1 | 12/2011 |
| WO | 2011/155139 A1 | 12/2011 |

OTHER PUBLICATIONS

Communication dated Oct. 21, 2014, issued by the German Patent Office in counterpart Application No. 112012003707.3.
Communication dated Oct. 21, 2014, issued by the German Patent Office in counterpart Application No. 112012003705.7.
Communication dated Oct. 21, 2014 issued by the German Patent Office in counterpart Application No. 112012003704.9.

\* cited by examiner

*Primary Examiner* — Thao T Tran
(74) *Attorney, Agent, or Firm* — Sughrue Mion, PLLC

(57) ABSTRACT

A member for vehicle according to the present invention includes a resinous substrate, and a protective film being formed on a surface of the resinous substrate partially at least. The protective film is made by curing a curing-type coating-agent composition containing: Component (A) (e.g., an isocyanuric ring-containing urethane (meth)acrylate compound) in an amount of from 20 to 80 parts by mass; Component (B) (e.g., an isocyanuric ring-containing tri (meth)acrylate compound free from any urethane bond) in an amount of from 10 to 70 parts by mass; Component (C) (e.g., a reaction product) between a colloidal silica and an alkoxysilane compound having a maleimide group) in amount of from 1 to 35 parts by mass; a radical-polymerization initiator serving as Component (D) in an amount of from 0.1 to 10 parts by mass; an ultraviolet absorber serving as Component (E) in an amount of from 1 to 12 parts by mass; and an organic solvent serving as Component (F) in an amount of from 10 to 1,000 parts by mass; with respect to a sum of the Component (A), the Component (B), and the Component (C) being taken as 100 parts by mass. Said protective film demonstrates excellent wear resistance and weatherability.

13 Claims, 2 Drawing Sheets

MEMBER FOR VEHICLE AND MANUFACTURING PROCESS FOR THE SAME

CROSS REFERENCE TO RELATED APPLICATIONS

This is a National Stage of International Application No. PCT/JP2012/005353 filed Aug. 27, 2012, claiming priority based on Japanese Patent Application No. 2011-194304 filed Sep. 6, 2011, the contents of all of which are incorporated herein by reference in their entirety.

TECHNICAL FIELD

The pre sent invent ion relates to a member for vehicle, such as interior/exterior materials for vehicle, outside plates for vehicle and resinous windows, for which high wear resistance and weatherability are required, and a manufacturing process for the same.

BACKGROUND ART

Resinous materials, among them, transparent resinous materials, which are represented by polycarbonate or the like, have been utilized widely in various applications while taking advantages of such characteristics as being low specific gravity as well as lightweight, being processed easily, and being strong against shocks compared with inorganic glass. Recently, from such a viewpoint assaying petroleum resources or reducing carbon dioxide emissions, the momentum for upgrading mileage or fuel consumption has been enhancing by means of substituting plastics for window glasses and interior/exterior materials for automobile in order to make them lightweight.

On the contrary, resinous materials have the following disadvantages: their surface is likely to be damaged so that the gloss or transparency is likely to be lost; they are likely to be damaged by organic solvents; or moreover, they are poor in the weatherability (e.g., the photo stability against ultraviolet rays, etc.) and heat resistance; and the like. Window glasses for automobile are often exposed to sunlight for a long period of time. Consequently, in the case of using resinous materials for members for automobile, it is necessary to impart them wear resistance and weatherability by means of covering their surface by a protective film, and so forth.

As such a protective film that is good in terms of the wear resistance and weatherability, a hard coating layer is given which is made by curing a photo curing-type coating-agent composition, for instance.

As a light curing-type coating-agent composition being provided with both wear resistance and weatherability combinedly, a composition for forming wear-resistant coating has been known (see Patent Literature No. 1). The composition comprises colloidal silica fine particles, a monomer mixture, and a photo-polymerization initiator in a specific proportion, respectively. The colloidal silica fine particles include a silane compound having a methacryloyloxy group, an acryloyloxy group or a vinyl group that is modified superficially in a predetermined weight proportion. The monomer mixture includes a poly[(meth)acryloyloxyalkyl] isocyanurate, and a urethane poly(meth)acrylate, which has an alicyclic framework.

Moreover, another coating-agent composition has also been known (see Patent Literature No. 2). The coating-agent composition includes the following in a specific proportion, respectively: a poly(meth)acrylate of mono- or poly-pentaerythritol; a urethane poly(meth)acrylate, which has at least two radically-polymerizable unsaturated double bonds; a poly[(meth)acryloyloxyalkyl] (iso)cyanurate; an ultraviolet absorber; a hindered amine-based light stabilizer; and a photo-polymerization initiator.

An example is also available in which a thermal curing-type coating-agent composition is used. Patent Literature No. 3 discloses a plastic article. In the plastic article, a first layer, which is made by curing a thermo-curing undercoating-agent composition being good in the weatherability, is disposed on a surface of a resinous substrate; and a second layer, which is made by curing a thermo-curing coating-agent composition being good in the wear resistance, is disposed on the first layer.

RELATED TECHNICAL LITERATURE

Patent Literature

Patent Literature No. 1: Japanese Patent Gazette No. 3747065;
Patent Literature No. 2: Japanese Unexamined Patent Publication (KOKAI) Gazette No. 2000-063701;
Patent Literature No. 3: Japanese Unexamined Patent Publication (KOKAI) Gazette No. 2001-214122; and
Patent Literature No. 4: Japanese Unexamined Patent Publication (KOKAI) Gazette No. 2010-254840

SUMMARY OF THE INVENTION

Assignment to be Solved by the Invention

In the plastic article being set forth in Patent Literature No. 3, the wear resistance, and the weatherability are made compatible with each other at higher level. However, thermal curing-type compositions have the following problems: they require a large amount of energy in order to form cured films, compared with photo curing-type compositions; and they are poor in terms of efficiency, because longer times are needed to heat them; and the like. Moreover, they are not desirable from the viewpoint of productivity, because the number of processing steps increases when not only a coating-agent composition but also an undercoating-agent composition are employed as done in Patent Literature No. 3. Hence, a coating-agent composition, which makes it possible to form protective films that demonstrate wear resistance and weatherability sufficiently without using any undercoating-agent composition, has been desired eagerly.

Using a photo curing-type composition makes production with good efficiency feasible. Although the above-mentioned urethane poly(meth)acrylate having an alicyclic framework is a component that improves the weatherability of hard coating layer, it is insufficient with regard to the wear resistance. In the respective examples according to Patent Literature No. 1, colloidal silica particles (or ultraviolet-curing silicone), which are modified superficially with a silane compound having a methacryloyloxy group, are employed along with this urethane poly(meth)acrylate. However, the resulting wear resistance cannot be said to be sufficient, and moreover it is unclear with regard to the weatherability after 2,000 hours or later.

On the other hand, a hard coating layer, which is made by curing the above-mentioned poly(meth)acrylate of mono- or poly-pentaerythritol, exhibits a high hardness. Hence, in Patent Literature No. 2, this component is used in combination with a urethane poly(meth)acrylate having at least two radically-polymerizable unsaturated double bonds, namely, a component that upgrades weatherability. However, as a result of investigations done by the present inventors, it was understood that it is not possible to withstand accelerated tests for much longer periods of time by simply using a component for upgrading wear resistance in combination with another component for upgrading weatherability.

Moreover, like the one as set forth in Patent Literature No. 4, an activated energy-ray curing-type composition including a radically-polymerizable compound has also been developed recently. This composition contains the following in a specific ratio: a specific urethane (meth)acrylate compound containing an isocyanurate framework; an acrylate compound having an isocyanurate framework; and radically-polymerizable inorganic fine particles. However, as a result of investigations done by the present inventors, it was understood that the composition was poor in terms of adhesiveness after long-time accelerated test.

In other words, even when a hard coating layer is formed on a surface of a resinous substrate with use of the above-mentioned photo curing-type coating-agent composition, it is difficult to make the resulting wear resistance and weatherability compatible with each other at higher level.

In view of these problematic issues, the present invention aims at providing a member for vehicle that comprises a protective film, which demonstrates excellent wear resistance and weatherability, on a surface of a resinous substrate.

Means for Solving the Assignment

As a result of the present inventors' earnest investigations, they found out that a composition is excellent in terms of post-curing transparency, wear resistance, and weatherability, composition in which the following are used combinedly in a specific proportion, respectively: an isocyanuric-ring containing urethane (meth)acrylate compound; an isocyanuric-ring containing tri(meth)acrylate compound being free from any urethane bond; and a reaction product between a colloidal silica and an alkoxysilane compound having a maleimide group; and additionally to which additives are added in an appropriate amount, respectively. Thus, they arrived at completing the present invention.

Specifically, a member for vehicle according to the present invention is characterized in that:

the member comprises a resinous substrate, and a protective film being formed on a surface of the resinous substrate partially at least;

said protective film is made by curing a curing-type coating-agent composition containing:
following Component (A) in an amount of from 20 to 80 parts by mass;
following Component (B) in an amount of from 10 to 70 parts by mass;
following Component (C) in an amount of from 1 to 35 parts by mass;
a radical-polymerization initiator serving as Component (D) in an amount of from 0.1 to 10 parts by mass;
an ultraviolet absorber serving as Component (E) in an amount of from 1 to 12 parts by mass; and
an organic solvent serving as Component (F) in an amount of from 10 to 1,000 parts by mass;
with respect to a sum of the Component (A), the Component (B) and the Component (C) being taken as 100 parts by mass.

Component (A):

an isocyanuric ring-containing urethane (meth)acrylate compound being expressed by following General Formula (1);

(Chemical Formula 1)

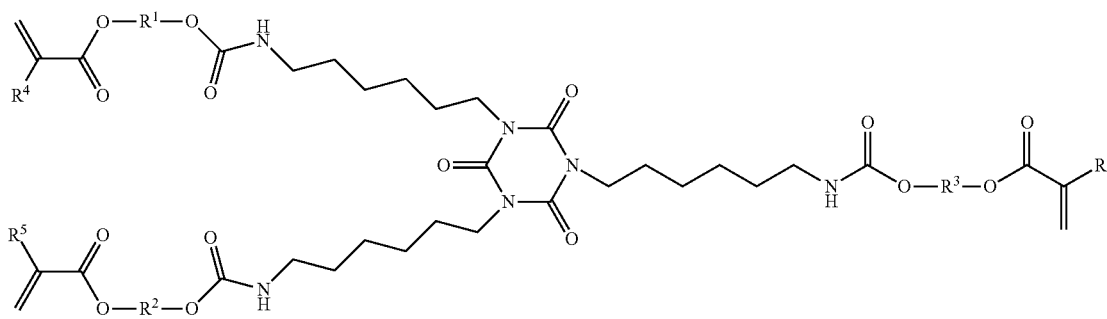

(1)

(In General Formula (1), each of $R^1$, $R^2$ and $R^3$ expresses a divalent organic group whose number of carbon atoms is from 2 to 10 independently; and each of $R^4$, $R^5$ and $R^6$ expresses a hydrogen atom, or a methyl group independently.);

Component (B):

an isocyanuric ring-containing tri(meth)acrylate compound being free from any urethane bond that is expressed by following General Formula (2);

(Chemical Formula 2)

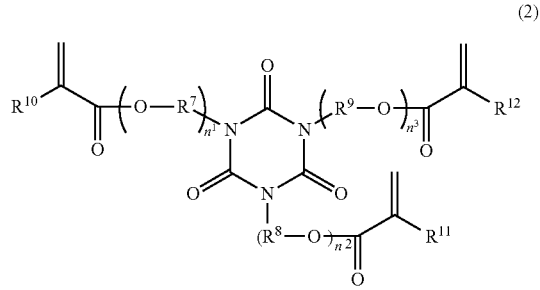

(2)

(In General Formula (2), each of $R^7$, $R^8$ and $R^9$ expresses a divalent organic group whose number of carbon atoms is from 2 to 10 independently; each of $R^{10}$, $R^{11}$ and $R^{12}$ expresses a hydrogen atom, or a methyl group independently; each of $n^1$, $n^2$ and $n^3$ expresses a number of from 1 to 3 independently; and $n^1+n^2+n^3$=from 3 to 9.);

Component (C):

an involatile component in reaction products being made by reacting an alkoxysilane compound (c1), which is expressed by following General Formula (3), with a colloidal silica (c2), in a mass ratio of from 9:1 to 1:9 between (c1) and (c2), the involatile component involving those in which (c2) is modified chemically with (c1);

(Chemical Formula 3)

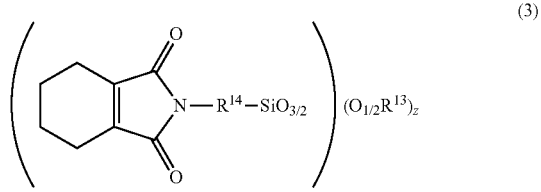

(3)

(In General Formula (3), $R^{13}$ expresses a hydrogen atom, or a monovalent organic group; $R^{14}$ expresses a divalent hydrocarbon whose number of carbon atoms is from 1 to 6; and "z" expresses a positive number of from 0.1 or more to 3 or less; moreover, when "z" is less than 3, the alkoxysilane compound (c1) involves a condensate, and $R^{13}$ within a molecule in the condensate may even involve two or more types of distinct groups.);

It is preferable for the curing-type composition employed in the present invention to further employ a photo radical-polymerization initiator serving as Component (D) so as to be employed as a light curing-type coating-agent composition that is cured by irradiating it with light. By means of curing the composition by irradiating it with light, it becomes feasible to cure it with lower energy in a shorter period of time. Moreover, by specifying a blending proportion of the ultraviolet absorber and furthermore a type of the ultraviolet absorber, the curing progresses satisfactorily even when curing the composition by irradiating it with light. Thus, protective films are obtainable which are excellent in terms of transparency, and in which the wear resistance and weatherability are made compatible with each other.

Effect of the Invention

The member for vehicle according to the present invention demonstrates excellent wear resistance and weatherability, because it comprises a protective film, which is made by curing the specific curing-type coating-agent composition, on a surface of the resinous substrate.

MODES FOR CARRYING OUT THE INVENTION

Figure 1:
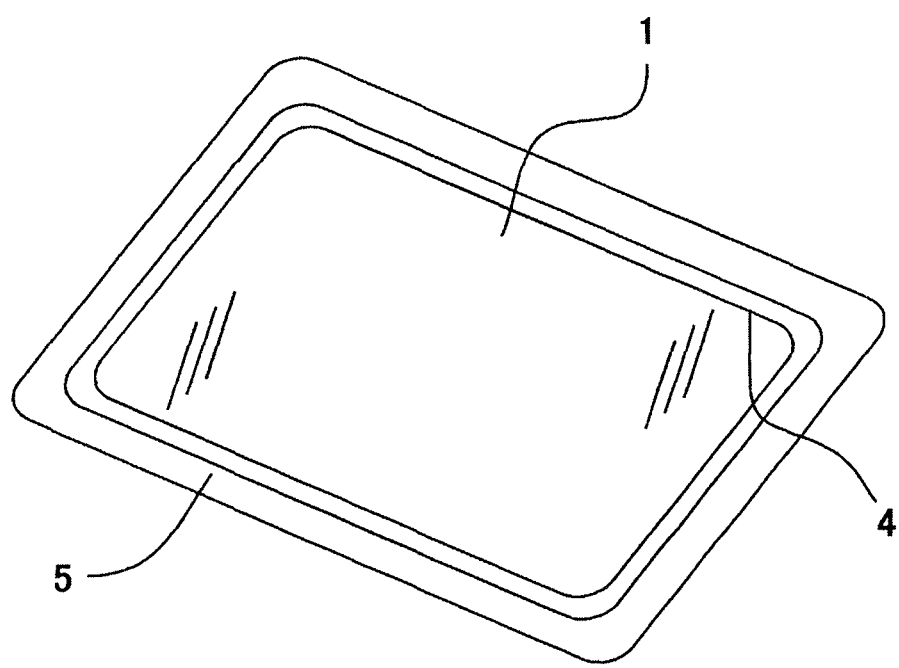
FIG. 1 is a perspective diagram that schematically illustrates a sunroof in which a member for vehicle according to the present invention is used.

Hereinafter, explanations will be made on some of the best modes for performing the member for vehicle according to the present invention. Note that, unless otherwise specified, ranges of numeric values, "from 'p' to 'q'" being set forth in the present description, involve the lower limit, "p," and the upper limit, "q," in those ranges. And, the other ranges of numeric values are composable by arbitrarily combining values that involve not only those upper-limit values and lower-limit values but also numerical values that are enumerated in the following examples.

A member for vehicle according to the present invention comprises a resinous substrate, and a protective film that is formed on a surface of the resinous substrate partially at least. The protective film is made by curing a curing-type coating-agent composition that will be explained hereinafter.

(Curing-Type Coating-Agent Composition)

A curing-type coating-agent composition (being abbreviated to as "composition" whenever appropriate) contains: Component (A) in an amount of from 20 to 80 parts by mass; Component (B) in an amount of from 10 to 70 parts by mass; Component (C) in an amount of from 1 to 35 parts by mass; a radical-polymerization initiator serving as Component (D) in an amount of from 0.1 to 10 parts by mass; an ultraviolet absorber serving as Component (E) in an amount of from 1 to 12 parts by mass; and an organic solvent serving as Component (F) in an amount of from 10 to 1,000 parts by mass; with respect to a sum of following Component (A), following Component (B) and following Component (C) being taken as 100 parts by mass. Hereinafter, explanations will be made on details of the composition and its respective components.

Note that, in the pre sent description, an acryloyl group or a methacryloyl group is expressed as a "(meth)acryloyl group." Moreover, acrylate or methacrylate is expressed as "(meth)acrylate."

Component (A)

Component (A) is an isocyanuric ring-containing urethane (meth)acrylate compound being expressed by following General Formula (1).

(Chemical Formula 4)

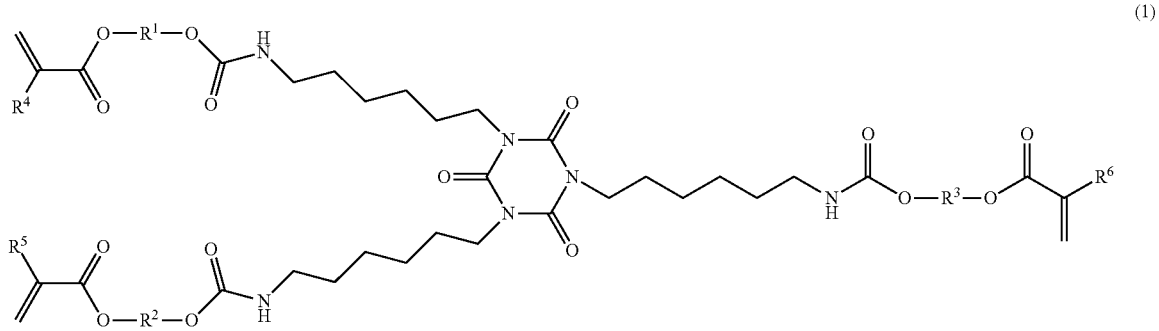

(1)

In General Formula (1), each of $R^1$, $R^2$ and $R^3$ expresses a divalent organic group whose number of carbon atoms is from 2 to 10 independently. As for a divalent organic group whose number of carbon atoms is from 2 to 10, an alkylene group, such as an ethylene group, a trimethylene group, a propylene group or a tetramethylene group, whose number of carbon atoms is from 2 to 4 is preferable. Moreover, compounds are also involved, compounds in which the compounds according to General Formula (1) that have one of these groups have been modified with ε-caprolactone. In this case, the divalent organic group whose number of carbon atoms is from 2 to 10 involves —$OCOCH_2CH_2CH_2CH_2CH_2$—. Of these, those in which all of $R^1$, $R^2$ and $R^3$ can respectively be a tetramethylene group are especially preferable, because protective films are obtainable which are excellent in terms of wear resistance and weatherability especially.

In General Formula (1), each of $R^4$, $R^5$ and $R^6$ expresses a hydrogen atom, or a methyl group independently. Compounds, in which all of $R^4$, $R^5$ and $R^6$ can respectively be a hydrogen atom, are especially preferable, from the viewpoint that the resulting compositions turn into ones that are excellent in terms of curability.

Compound (A) can be synthesized by means of addition reaction between a nurate-type trimer of hexamethylene diisocyanate and hydroxyalkyl (meth)acrylate or its caprolactone-modified product. Although the addition reaction is feasible even without any catalyst, it is also allowable to add a tin-based catalyst, such as dibutyltin dilaurate, or an amine-based catalyst, such as triethylamine, and the like, in order to advance the reaction efficiently.

A content proportion of Component (A) in the composition can be from 20 to 80 parts by mass, more preferably, from 30 to 70 parts by mass, with respect to a sum of Component (A), Component (B) and Component (C) being taken as 100 parts by mass. By setting a content proportion of Component (A) at from 20 to 80 parts by mass, protective films are obtainable which are excellent in terms of wear resistance and weatherability.

Component (B)

Component (B) is an isocyanuric ring-containing tri(meth)acrylate compound being free from any urethane bond that is expressed by following General Formula (2).

(Chemical Formula 5)

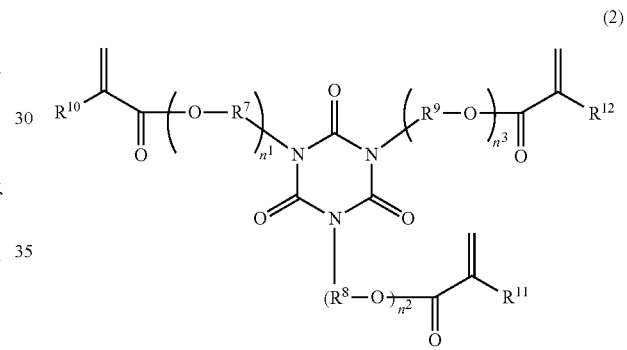

(2)

In General Formula (2), each of $R^7$, $R^8$ and $R^9$ expresses a divalent organic group whose number of carbon atoms is from 2 to 10 independently. As for a divalent organic group whose number of carbon atoms is from 2 to 10, an alkylene group, such as an ethylene group, a trimethylene group, a propylene group or a tetramethylene group, whose number of carbon atoms is from 2 to 4 is preferable. Moreover, compounds are also involved, compounds in which the compounds according to General Formula (2) that have one of these groups have been modified with ε-caprolactone. In this case, the divalent organic group whose number of carbon atoms is from 2 to 10 involves —$OCOCH_2CH_2CH_2CH_2CH_2$—. Of these, those in which all of $R^7$, $R^8$ and $R^9$ can respectively be an ethylene group are especially preferable, because it is possible to obtain protective films that are excellent in terms of wear resistance and weatherability especially.

In General Formula (2), each of $R^{10}$, $R^{11}$ and $R^{12}$ expresses a hydrogen atom, or a methyl group independently. Compounds, in which all of these can respectively be a hydrogen atom, are especially preferable, from the viewpoint that the resulting compositions turn into ones that are excellent in terms of curability.

In General Formula (2), each of $n^1$, $n^2$ and $n^3$ expresses a number of from 1 to 3 independently. However, $n^1+n^2+n^3$=from 3 to 9. As for $n^1$, $n^2$ and $n^3$, they can preferably be 1, respectively. As for $n^1+n^2+n^3$, it can preferably be 3.

Compound (B) can preferably be produced by reacting an alkylene oxide adduct of isocyanuric acid with a (meth) acrylic acid. Note that $n^1+n^2+n^3$ herein expresses an average number of alkylene oxides per one molecule of Compound (B).

A content proportion of Component (B) in the composition can be from 10 to 70 parts by mass, more preferably, from 20 to 60 parts by mass, with respect to a sum of Component (A), Component (B) and Component (C) being taken as 100 parts by mass. By setting a content proportion of Component (B) at 10 parts or more, it is possible to make the initial adhesiveness between a resinous substrate and the resulting protective films satisfactory; and, by setting it at from 10 to 70 parts by mass, protective films are obtainable which are excellent in terms of wear resistance and weatherability.

Note that, in compliance with a content proportion of Component (B) within the composition, the thickness-wise distribution of silicon (Si) being included in the resulting protective films changes. Si being included in the resultant protective films derives from later-described Component (C). To be concrete, when being protective films including Component (C) in an identical proportion, the greater the content proportion of Component (B) is, the more Si, which is to be detected in the film surface, increases. And, as a film as a whole, Si within the film is concentrated at positions apart from the substrate to be present therein. That is, the more Component (B) is the more high Si-concentration parts tend to shift toward the surface. A protective film, which includes Si more on the film's surface side, is preferable, because it is excellent in terms of scratch resistance. It is desirable to set a content of Component (B) at from 25 to 55 parts, furthermore at from 30 to 50 parts by mass, because that enables the wear resistance and the weatherability, as well as the scratch resistance, to be compatible with each other.

To be concrete, when an Si concentration within the resulting protective films, which is calculated from the blending proportions of Component (A), Component (B), Component (C) and Component (E), is labeled a theoretical Si concentration, it is preferable that parts, whose Si concentration is higher than the theoretical Si concentration, can be present in an interval from the surface of the resultant protective films and down to a half of the thickness of those protective films. Alternatively, when the resulting protective films are divided into two parts at a position where the film thickness is halved, the surface-side film and the substrate-side film, it is preferable that the surface-side film's Si concentration can be higher than the substrate-side film's Si concentration.

The Si concentrations within the resulting protective films are measurable by subjecting the cross section of the resultant protective films to point analysis or line analysis along the film-thickness-wise direction by means of elemental analysis with use of a scanning-type analyzer microscope (e.g., SEM/EDX), and so on.

Component (C)

Component (C) is an involatile component in react ion products being made by reacting an alkoxysilane compound (c1), which is expressed by following General Formula (3), with a colloidal silica (c2), in a mass ratio of from 9:1 to 1:9 between (c1) and (c2), and the involatile component involves those in which (c2) is modified chemically with (c1).

Note that, although the synthesis of Component (C) is usually carried out in a solvent, Component (C) can be components from which water and the organic solvent that have been employed in the reaction are excluded. Moreover, Component (C) can be components from which alcohols that alkoxysilanes are hydrolyzed to generate, and water that is generated by the condensation of silanols, are excluded. That is, Component (C) means an involatile component within reaction products. To put it differently, it means an Si-containing component.

(Chemical Formula 6)

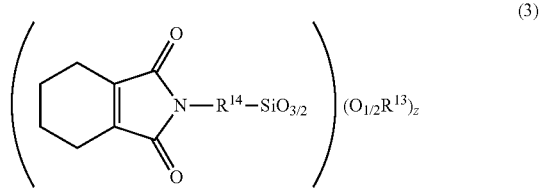

(In General Formula (3), $R^{13}$ expresses a hydrogen atom, or a monovalent organic group; $R^{14}$ expresses a divalent hydrocarbon whose number of carbon atoms is from 1 to 6; and "z" expresses a positive number of from 0.1 or more to 3 or less; moreover, when "z" is less than 3, the alkoxysilane compound (c1) involves a condensate, and $R^{13}$ within a molecule in the condensate may even involve two or more types of distinct groups.)

In General Formula (3), $R^{13}$ expresses a hydrogen atom, or a monovalent organic group. As for a monovalent organic group for $R^{13}$, the following can be given concretely: an alkyl group whose number of carbon atoms is from 1 to 6; an alkoxyalkyl group whose number of carbon atoms is from 1 to 6; and other organic groups comprising C, H and O atoms whose number of carbon atoms is from 1 to 6.

From the viewpoint of reactivity, $R^{13}$ can preferably be a hydrogen atom, or a monovalent organic group whose number of carbon atoms is from 1 to 6 and which may also have an oxygen atom; or can more preferably be a hydrogen atom, or an alkyl group whose number of carbon atoms is from 1 to 6.

In General Formula (3), $R^{14}$ expresses a divalent saturated hydrocarbon group whose number of carbon atoms is from 1 to 6, and can also have straight-chain or linear shapes or even have branches. As for a linear saturated hydrocarbon group, it is possible to exemplify an ethylene group, a 1,3-propylene group (or trimethylene group), a 1,4-buthylene group (or tetramethylene group), a 1,5-pentanediyl group (or pentamethylene group), and a 1,6-hexanediyl group (or hexamethylene group). As for a branched alkylene group, it is possible to exemplify a 1,2-propylene group, a 1,2-butylene group, a 1,3-buthylene group, a 2,3-butylene group, a 1,3-pentanediyl group, a 2,4-pentanediyl group, a 2,5-hexanediyl group, a 2-methyl-1,3-propylene group, a 2-ethyl-1,3-propylene group, and a 3-methyl-1,5-pentanediyl group.

As for $R^{14}$, a linear divalent saturated hydrocarbon group whose number of carbon atoms is from 3 to 6 is preferable especially.

From the viewpoint that protective films resulting from the composition turn into ones which are excellent in terms of wear resistance and weatherability, the following can be an especially suitable option as $R^{14}$: a divalent saturated hydrocarbon group whose number of carbon atoms is from 1 to 6, or furthermore a linear divalent saturated hydrocarbon group whose number of carbon atoms is from 3 to 6.

In General Formula (3), "z" is a positive number, and satisfies 0.1≤"z"≤3. "z" expresses an average number of moles of residual alkoxy group per one mole of Si atom. When "z" is 3, (c1) represents an alkoxysilane monomer; and, when "z" is less than 3, it represents an alkoxysilane monomer condensate, or a mixture of an alkoxysilane monomer condensate and an alkoxysilane monomer.

By setting "z" at 0.1 or more, the colloidal silica is superficially modified effectively, and so the resulting protective films turn into ones which are excellent in terms of scratch resistance. Moreover, from the standpoint of reactivity, "z" can preferably satisfy 0.4≤"z"≤3, or furthermore 0.8≤"z"≤3.

Note that it is possible to find the value of "z" from the integral ratio of hydrogen atom after measuring the $^1$H-NMR spectrum for (c1).

In a case where (c1) is a condensate, $R^{13}$ may even have two or more types of distinct chemical structures within in one molecule, respectively.

Note that, when a 3,4,5,6-tetrahydrophathalimide group for General Formula (3) absorbs an ultraviolet ray, the 3,4,5,6-tetraphathalimide groups photo dimerize one another.

Explanations will be made on a preferable production process for said compound according to Formula (3). For example, a process comprising the following can be given: turning a carboxylic acid anhydride having a double bond, which is expressed by following General Formula (4), into an amic acid by adding an aminoalkyltrialkoxysilane, which is expressed by following General Formula (5), to the carboxylic acid anhydride; subjecting the resulting amic acid thereafter to ring closing to make a maleimide group by means of heating; and then subsequently reacting the alkoxy group with water that generates on the above occasion. This process is especially preferable, from such a viewpoint that, in accordance with the process, it is possible to produce (c1), which is suitable for the curing-type coating-agent composition, by a one-step reaction with use of raw materials, which are readily procurable.

(Chemical Formula 7)

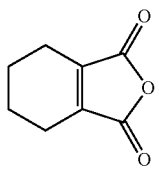

(4)

(5)

Note that, in General Formula (5), $R^{13}$ and $R^{14}$ are synonymous with those above-mentioned.

First of all, the amino group of an aminoalkyltrialkoxysilane (5) is added to a carboxylic acid anhydride (4) having a double bond, and thereby an amic acid (hereinafter, being referred to as "AMA") generates. Next, when heating a solution including the AMA, a ring-closing reaction proceeds, and thereby a maleimide group generates. Since water generates in the ring-closing reaction, a hydrolytic condensation reaction of the alkoxy group proceeds by means of that water.

Note herein that, in a case where the ring-closing reaction is complete and the generated water are consumed fully for the hydrolytic condensation reaction of alkoxysilane, "z" becomes 1 theoretically. "z" in Formula (3) can fall in a range of from 1 to 3. In a case where "z" is set at less than 1, a method of adding water to the reaction system can be given. On the other hand, in another case where "z" is set at more than 1, it is possible to adjust it so by removing water from the reaction system, or by employing a dewatering agent.

It is advisable that the aforementioned production process can be carried out in the presence of an organic solvent. As for the organic solvent, organic solvents are preferable which dissolve the AMA and which do not react with raw materials. To be concrete, an aromatic compound, such as toluene or xylene, is preferable. However, since the reaction between acid anhydride and amino group is very quick, it is possible to employ a polar solvent, such as alcohol or ester, as well.

As for a temperature of the ring-closing reaction, it can preferably fall in a range of from 70 to 150° C.

In a case where a compound that hardly dissolves water (namely, an aromatic compound, for instance) is employed as the organic solvent, it is preferable to carry out desolvating after completing the reaction.

As for a proportion between the carboxylic acid anhydride having a double bond and the aminoalkyltrialkoxysilane, it can preferably be equimolar to each other. As for the carboxylic acid anhydride having a double bond and as for the aminoalkyltrialkoxysilane, it is also possible to combinedly use a plurality of species for each of them.

(c2) is a colloidal silica; although it is possible to employ various species for it, one in which spherical particles are dispersed uniformly is preferable. For example, one in which they are dispersed uniformly in an alcohol-based solvent is more preferable.

As for an average primary particle diameter of (c2), it can preferably be from 1 to 100 nm, or can more preferably be from 5 to 60 nm; and it can especially preferably be from 5 to 30 nm. By setting an average primary particle diameter of (c2) at ones being larger than 1 nm, it is possible to turn (c2) into those which are excellent in terms of wear resistance; and, by setting it at ones being smaller than 100 nm, it is possible to turn (c2) into those which are excellent in terms of the dispersion stability in the resulting colloidal solution.

Note that, in the present invention, the "average primary particle diameter" means values that are calculated from specific surface areas in accordance with the BET method. Moreover, it is advisable that a specific surface area of (c2) can fall in a range of from 30 to 3,000 m$^2$/g.

A preferable synthesis process for Component (C) can be a process that comprises the steps of charging (c1) and (c2) in a predetermined mass ratio, respectively, in the presence of an organic solvent including water; and thereafter heating them to undergo reactions. Although it is not possible to prescribe the heating temperature and time in general because they depend on the presence or absence of catalyst, the latter can desirably be from 0.5 to 20 hours when the former can be from 40 to 140° C., or desirably from 60 to 120° C.

In Component (C), not only silica fine particles which are modified superficially with (c1), but also hydrolytic condensates of (c1) that do not include any silica fine particles may even be included, and so those including them are defined as Component (C).

Moreover, the concept of Component (C) also involves reaction products as well that result from adding maleimide group-containing alkoxysilanes, which are synthesized from compounds being expressed by said Formula (4) and aminoalkylmethyldialkoxysilane in the same manner as (c1), or other alkoxysilane compounds, such as methyltrialkoxysilane, to (c1) and then reacting them with (c2). In this case, however, it is preferable that a charging amount of the other alkoxysilane compounds can be half or less of that of (c1).

Although a charging mass ratio between (c1) and (c2) can be from 1:9 to 9:1 upon synthesizing Component (C), it can more preferably be from 2:8 to 7:3, much more preferably from 2:8 to 6:4. By setting the mass ratio between (c1) and (c2) at from 1:9 to 9:1, it is possible to make the wear resistance and weatherability of the resulting protective films compatible with each other.

It is preferable that an amount of water to be charged into the reaction system can be from 0.3 to 10 mol, and it is more preferable that it can be from 0.5 to 5 mol, with respect to 1-mol alkoxy group in (c1). By setting the charging amount of water at from 0.3 to 10 mol with respect to 1-mol alkoxy group, it is possible to superficially modify the surface of silica fine particles efficiently without ever turning the silica fine particles into a gel.

As for the organic solvent, one which dissolves water uniformly is preferable; an alcohol-based solvent whose boiling point is from 100° C. to 200° C. is more preferable; and an alcohol-based solvent whose boiling point is from 100° C. to 200° C. and which has an ether bond is much more preferable.

As for concrete examples of the preferable organic solvent, the following can be given: propylene glycohol monomethylether; propylene glycohol monoethylether; propylene glycohol monopropylether; propylene glycohol monobutylether; ethylene glycohol monomethylether; ethylene glycohol monoethylether; ethylene glycohol monopropylether; and ethylene glycohol monobutylether.

Note that, although Component (C) can be produced without any catalyst, it is advisable to add an acid catalyst or alkali catalyst.

After completing the reaction, it is allowable to remove water that is included within the reaction system. It is permissible to heat and/or depressurize the post-reaction solution in order to remove water and furthermore to distill away the organic solvent. On this occasion, it is preferable to add another organic solvent, whose boiling point is higher than that of water, to the post-reaction solution.

A content proportion of Component (C) in the composition can be from 1 to 35 parts by mass, can more preferably be from 1 to 30 parts by mass, can much more preferably be from 3 to 25 parts by mass, or can especially preferably be from 5 to 20 parts by mass, with respect to a sum of Component (A), Component (B) and Component (C) being taken as 100 parts by mass.

By setting the content proportion of Component (C) at from 1 to 35 parts by mass, it is possible to adapt the composition into one from which protective films that are excellent in terms of wear resistance and weatherability are obtainable. When the proportion of Component (C) is 1 part by mass or more, the wear resistance of the resulting protective films upgrades. However, when Component (C) is too much, the weatherability declines because the resultant protective films become likely to contract or because decompositions of organic segments in the resulting protective films become quick.

Component (D)

Radical-Polymerization Initiator

Component (D) is a radical-polymerization initiator, and it is possible to employ various compounds for it.

When a photo radical-polymerization initiator is employed as Component (D), the resulting composition works as a light curing-type coating-agent composition, and is cured by means of light irradiation. When a thermal radical-polymerization initiator is used as Component (D), the resultant composition works as a thermal curing-type coating-agent composition, and is cured by means of heating.

It is preferable that the composition can be a light curing-type coating-agent composition in which a photo radical-polymerization initiator is employed as Component (D), from such a viewpoint that it makes curing with lower energy and for a shorter period of time feasible, or it is excellent in terms of curability, and the like.

As for concrete examples of the photo radical-polymerization initiator, the following can be given: acetophenone based compounds, such as 2,2-dimethoxy-1,2-diphenylethane-1-one, 1-hydroxycyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-[4-(methylthio)phenyl]-2-morpholinopropane-1-one, 2-benzyl-2-dimethylamino-1-(4-morpholinophenyl)-butane-1-one, diethoxyacetophenone, oligo{2-hydroxy-2-methyl-1-[4-(1-methylvinyl)phenyl]propanone} and 2-hydroxy-1-{4-[4-(2-hydroxy-2-methylpropionyl)benzyl]phenyl}-2-methyl-propane-1-one; benzophenone-based compounds, such as benzophenone, 4-phenylbenzophenone, 2,4,6-trimethylbenzophenone and 4-benzoyl-4'-methyl-diphenylsulfide; α-ketoester-based compounds, such as methyl benzoylformate, 2-(2-oxo-2-phenylacetoxyethoxy) ethyl ester of oxyphenyl acetic acid and 2-(2-hydroxyethoxy)ethyl ester of oxyphenyl acetic acid; phosphine oxide-based compounds, such as 2,4,6-trimethylbenzoyl diphenyl phosphine oxide, bis(2,4,6-trimethylbenzoyl)-phenylphosphine oxide, bis(2,6-dimethoxybenzoyl)-2,4,4-trimethylpentyl phosphine oxide; benzoin-based compounds, such as benzoin, benzoin methyl ether, benzoin ethyl ether, benzo in isopropyl ether and benzoin isobutyl ether; titanocene-based compounds; acetophenone/benzophenone-hybrid-based photo initiators, such as 1-[4-(4-benzoylphenylsulfanyl)phenyl]-2-methyl-2-(4-methylphenylsulfinyl) propane-1-one; and oxime ester-based photo polymerization initiators, such as 2-(O-benzoyloxime)-1-[4-(phenylthio)]-1,2-octanedione; as well as camphorquinone.

As for concrete examples of the thermal radical-polymerization initiator, an organic peroxide, and an azo-based compound, and the like, can be named.

As for concrete examples of the organic peroxide, the following can be given: 1,1-bis(t-butylperoxy)2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-butylperoxycyclohexyl)propane, 1,1-bis(t-butylperoxy) cyclododecane, t-hexylperoxy isopropyl monocarbonate, t-butylperoxymaleic acid, t-butylperoxy-3,5,5-trimethylhexanoate, t-butyl peroxylaurate, 2,5-dimethyl-2,5-di(m-toluoylperoxy)hexane, t-butylperoxy isopropyl monocarbonate, t-butylperoxy 2-ethylhexyl monocarbonate, t-hexyl peroxybenzoate, 2,5-dimethyl-2,5-di(benzoylperoxy) hexane, t-butyl peroxyacetate, 2,2-bis(t-butylperoxy)butane, t-butyl peroxybenzoate, n-butyl-4,4-bis(t-butylperoxy)valerate, di-t-butyl peroxyisophthalate, α,α'-bis(t-butylperoxy) diisopropylbenzene, dicumyl peroxide, 2,5-dimethyl-2,5-di (t-butylperoxy)hexane, t-butyl cumyl peroxide, di-t-butyl peroxide, p-menthanehydroperoxide, 2,5-dimethyl-2,5-di(t-butylperoxy)-3-hexyne, diisopropylbenzene hydroperoxide, t-butyl trimethylsilyl peroxide, 1,1,3,3-tetramethylbutyl hydroperoxide, cumene hydroperoxide, t-hexyl hydroperoxide, and t-butyl hydroperoxide.

As for concrete examples of the azo-based compound, the following can be given: 1,1'-azobis(cyclohexane-1-carbonitrile), 2-(carbamoylazo)isobutyronitrile, 2-phenylazo-4-methoxy-2,4-dimethylvaleronitrile, azo di-t-octane, and azo di-t-butane.

It is also allowable to use one of the above-enumerated radical-polymerization initiators independently, or it is even permissible to use two or more of them combinedly. Moreover, it is also feasible to make the organic peroxides redox catalysts by means of combining them with a reducing agent.

A content proportion of Component (D) in the composition can be from 0.1 to 10 parts by mass, can more preferably be from 0.5 to 5 parts by mass, or can especially preferably be from 1 to 3 parts by mass, with respect to a sum of Component (A), Component (B) and Component (C) being taken as 100 parts by mass.

By setting the content proportion of Component (D) at from 0.1 to 10 parts by mass, the resulting composition becomes one which is excellent in terms of curability, and so protective films are obtainable which are excellent in terms of wear resistance and weatherability.

Component (E)

Ultraviolet Absorber

Component (E) is an ultraviolet absorber, and it is possible to employ various compounds or substances for it.

As for concrete examples of the ultraviolet absorber, the following can be given: triazine-based ultraviolet absorbers, such as 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2-ethylhexyloxy)propyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxy phenyl)-1,3,5-triazine, and 2-(2-hydroxy-4-[1-octyloxycarbonylethoxy]phenyl)-4,6-bis(4-phenylphenyl)-1,3,5-triazine; benzotriazole-based ultraviolet absorbers, such as 2-(2H-benzotriazol-2-yl)-4,6-bis(1-methyl-1-phenyl-ethyl)phenol, 2-(2-hydroxy-5-tert-butylphenyl)-2H-benzotriazole, and 2-[2-hydroxy-5-(2-(meth)acryloyloxyethyl)phenyl]-2H-benzotriazole; benzophenone-based ultraviolet absorbers, such as 2,4-dihydroxybenzophenone, and 2-hydroxy-4-methoxybenzophenone; cyanoacrylate-based ultraviolet absorbers, such as ethyl-2-cyano-3,3-diphenylacrylate, and octyl-2-cyano-3,3-diphenylacrylate; and inorganic fine particles, such as titanium oxide fine particles, zinc oxide fine particles, and tin oxide fine particles, which absorb ultraviolet rays.

It is also allowable to use one of the above-enumerated ultraviolet absorbers independently, or it is even permissible to use two or more of them combinedly.

Of those above, the benzotriazole-based ultraviolet absorbers, which have a (meth)acryloyl group, are especially preferable, from such a viewpoint that they make the weatherability and wear resistance of the resulting protective films compatible with each other.

A content proportion of Component (E) in the composition can be from 1 to 12 parts by mass, or can more preferably be from 3 to 12 parts by mass, with respect to a sum of Component (A), Component (B) and Component (C) being taken as 100 parts by mass.

By setting the content proportion of Component (E) at from 1 to 12 parts by mass, it is possible to make the wear resistance and weatherability of the resulting protective films compatible with each other. When Component (E) is less than 1 part by mass, no protective films, which exhibit weatherability sufficiently, are obtainable. On the other hand, when Component (E) is too much, not only because the wear resistance of the resultant protective films declines, but also because the weatherability also tends to decline, Component (E) is set at 12 parts by mass or less. In particular, by setting the content proportion of Component (E) at from 3 to 12 parts by mass, protective films, in which excellent wear resistance and weatherability are made compatible with each other, are obtainable.

Component (F)

Organic Solvent

Component (F) is a solvent, and it is possible to employ various compounds for it.

As for Component (F), it is preferable to use one which can uniformly disperse or dissolve Component (A), Component (B), Component (C), Component (D) and Component (E), and additionally the other components being described later.

As for concrete examples of preferable solvents, the following can be given: alcohols, such as ethanol, and isopropanol; alkylene glycol monoethers, such as ethylene glycol monomethylether, propylene glycol monomethylether, propylene glycol monoethylether, propylene glycol monopropylether, and propylene glycol monobutylether; aromatic compounds, such as toluene, and xylene; esters, such as propylene glycol monomethylether acetate, ethyl acetate, and butyl acetate; ketones, such as acetone, methyl ethyl ketone, and methyl isobutyl ketone; ethers, such as dibutyl ether; and diacetone alcohol; as well as N-methylpyrrolidone. Of these, the alkylene glycol monoethers, such as propylene glycol monomethylether, are especially preferable, not only because they are excellent in terms of dispersibility or solubility for each of the respective components, but also because, in a case where the resinous substrate, onto which the composition is applied, is made of polycarbonate resins, they do not dissolve the polycarbonate resins.

Moreover, a method is also applicable preferably in which a solvent, such as alcohols or alkylene glycol monoethers, being incapable of dissolving polycarbonate resins, is mixed with another solvent, such as esters or ketones, being capable of dissolving polycarbonate resins so as not to dissolve a resinous substrate being made of polycarbonate resin at the time of application but to melt the resinous substrate's surface on the order of micrometer at a subsequent heating step, thereby enhancing the adhesiveness of the resulting paint films. In addition, another method is applicable preferably as well in which solvents with various boiling points are mixed with each other, thereby enhancing the smoothness or flatness of the resultant paint films' surface.

A content proportion of Component (F) in the composition can be from 10 to 1,000 parts by mass with respect to a sum of Component (A), Component (B) and Component (C) being taken as 100 parts by mass. When a blending amount of Component (F) is too less, it is less likely to carry out coating uniformly; whereas it is less likely to obtain protective films with a sufficient thickness when it is too much. Therefore, the content proportion of Component (F) can preferably be from 50 to 500 parts by mass, or can more preferably be from 50 to 300 parts by mass, when prescribing it daringly, from the standpoint of productivity, although it is advisable to appropriately select the content proportion depending on coating methods.

Note that the content proportion of Component (F) shall involve organic solvents, which are present at the time of preparing the composition along with not only Components (A) through (E) but also later-described Component (G) and Component (H) as well as the other components.

Component (G)

Hindered Amine-Based Light Stabilizer

Although the composition is one to which said Components (A) through (F) are indispensable, it is advisable to further blend a hindered amine-based light stabilizer (G) (hereinafter, being referred to as "Component (G)") in order to upgrade the weatherability.

As for concrete examples of the hindered amine-based light stabilizer, the following hindered amine-based light stabilizers can be given: bis(1,2,2,6,6-pentamethyl-4-piperidinyl) sebacate, methyl (1,2,2,6,6-pentamethyl-4-piperidinyl) sebacate, 2,4-bis[N-butyl-N-(1-cyclohexyloxy-2,2,6,6-tetramethyl-piperidin-4-yl)amino]-6-(2-hydroxyethylamine)-1,3,5-triazine, and decanedioic acid bis (2,2,6,6-tetramethyl-1-(octyloxy)-4-piperidinyl) ester.

Of these, those whose basicity of hindered amine is lower are preferable, from the viewpoint of the resulting composition's stability. To be concrete, those having an aminoether group, namely, so-called NOR-type ones, are more preferable.

A content proportion of Component (G) can preferably be from 0.05 to 1.5 parts by mass, or furthermore from 0.1 to 1.5 parts by mass, with respect to a sum of Component (A), Component (B) and Component (C) being taken as 100 parts by mass.

Component (H)

Surface Modifier

In order to enhance leveling property at the time of applying, or in order to enhance the sliding property of the resulting protective films to enhance the scratch resistance, it is also advisable to further add various surface modifiers to the composition. As for the surface modifiers, it is possible to employ various additives for modifying superficial properties, which are commercially available under such a name as a surface-modifying agent, a leveling agent, a sliding-property imparting agent, or an antifouling-property imparting agent, and the like. Of those, silicone-based surface modifiers, and fluorine-based surface modifiers are suitable.

As for their concrete examples, the following can be given: silicone-based polymers and oligomers, which have a silicone chain and polyalkylene oxide chain; silicone-based polymers and oligomers, which have a silicone chain and polyester chain; fluorine-based polymers and oligomers, which have a perfluoroalkyl group and polyalkylene oxide chain; and fluorine-based polymers and oligomers, which have a perfluoroalkyl ether chain and polyalkylene oxide chain. It is allowable to employ one or more types of these. For the purpose of enhancing and so forth the sustainability of the resulting sliding property, it is also permissible to employ one which contains a (meth)acryloyl group within the molecule.

A preferable blending amount of the surface modifier can be from 0.01 to 1.0 part by mass with respect to a sum of Component (A), Component (B) and Component (C) being taken as 100 parts by mass. By setting the blending amount of the surface modifier at from 0.01 to 1.0 part by mass, it is possible to enhance the superficial flatness or smoothness of the resulting paint films.

Other Components

Although the composition is one to which said Components (A) through (F) are indispensable, it is possible to further blend various components in compliance with objectives. It is also allowable to blend one of aforementioned Component (G), Component (H) and below-enumerated other component independently, or it is even permissible to blend two or more species of them.

For the purpose of making the preservation stability of the composition satisfactory, it is preferable to add a radical-polymerization inhibitor to it.

As for concrete examples of the polymerization inhibitor, the following can be given: hydroquinone, tert-butylhydroquinone, hydroquinone monomethyl ether, 2,6-di-tert-butyl-4-methyl phenol, 2,4,6-tri-tert-butyl phenol, benzoquinone, phenothiazine, N-nitroso phenylhydroxylamine, ammonium salts of N-nitroso phenylhydroxylamine, aluminum salts of N-nitroso phenylhydroxylamine, copper dibutyldithiocarbamate, copper chloride, and copper sulfate.

It is preferable to set an addition amount of the polymerization inhibitor at from 10 to 10,000 ppm, or it can more preferably be from 100 to 3,000 ppm, with respect to a sum of Component (A), Component (B), and Component (C) being taken as 100 parts by mass.

For the purpose of making the heat resistance and weatherability of the resulting protective films satisfactory, it is also advisable to further blend various oxidation inhibitors to the composition. As for some of the oxidation inhibitors, primary oxidation inhibitors, such as hindered phenol-based oxidation inhibitors; and sulfur-based and phosphorous-based secondary oxidation inhibitors can be named.

As for concrete examples of the primary oxidation inhibitors, the following can be given: pentaerythritol tetrakis[3-(3,5-di-tert-butyl-4-hydroxyphenyl)propionate], ethylene bis(oxyethylene) bis[3-(5-tert-butyl-4-hydroxy-m-tolyl)propionate], and 1,3,5-tris[(4-tert-butyl-3-hydroxy-2,6-xylyl) methyl]-1,3,5-triazine-2,4,6(1H,3H,5H)-trione.

As for concrete examples of the secondary oxidation inhibitors, the following can be given: didodecyl 3,3'-thiodipropionate, 4,6-bis(octylthiomethyl)-o-cresol, and tris(2,4-di-tert-butylphenyl)phosphite.

A preferable blending amount of the oxidation inhibitors can be from 0 to 5 parts by mass, or more preferably from 0 to 3 parts by mass, with respect to a sum of Component (A), Component (B) and Component (C) being taken as 100 parts by mass.

It is also advisable to further add a compound, which is other than Component (A) and Component (B) and which has one or more radically-polymerizable unsaturated groups within one molecule, to the composition.

The compound having one radically-polymerizable unsaturated group within one molecule (hereinafter, being referred to as "monofunctional unsaturated compound") can be blended in order to enhance the adhesiveness between the resinous substrate and the resulting protective films.

As for the radically-polymerizable unsaturated group in the monofunctional unsaturated compound, a (meth)acryloyl group is preferable.

As for a blending proportion of the monofunctional unsaturated compound, it is preferable to set it at 20 parts by mass or less with respect to a sum of Component (A), Component (B) and Component (C) being taken as 100 parts by mass, from the standpoint of preventing the resulting wear resistance and weatherability from worsening.

As for concrete examples of the monofunctional unsaturated compound, the following can be given: (meth)acrylic acid, Michael addition-type dimers of acrylic acid, ω-carboxy-polycaprolactone mono(meth)acrylate, monohydroxylethyl phthalate (meth)acrylate, methyl (meth)acrylate, ethyl (meth)acrylate, butyl (meth)acrylate, 2-ethylhexyl (meth)acrylate, benzyl (meth)acrylate, phenyl (meth)acrylate, phenol-alkylene oxide adduct (meth)acrylate, alkylphenol-alkylene oxide adduct (meth)acrylate, cyclohexyl (meth)acrylate, tert-butylcyclohexyl (meth)acrylate, 2-hydroxyethyl (meth)acrylate, 2-hydroxypropyl (meth)acrylate, 4-hydroxybutyl acrylate, paracumylphenol-alkylene oxide adduct (meth)acrylate, orthophenylphenol (meth)acrylate, orthophenylphenol-alkylene oxide adduct (meth)acrylate, tetrahydrofurfuryl (meth)acrylate, isobornyl (meth)acrylate, tricyclodecanemethylol (meth)acrylate, 2-hydroxy-3-phenoxypropyl (meth)acrylate, N-(2-(meth)acryloxyethyl)hexahydrophthalimide, N-(2-(meth)acryloxyethyl)tetrahydrophthalimide, N,N-dimethylacrylamide, acryloylmorpholine, N-vinylpyrrolidone, and N-vinylcaprolactam.

In the composition, it is also advisable to further blend another compound having two or more radically-polymerizable unsaturated groups within one molecule (hereinafter, being referred to as "multi-functional unsaturated compound"). Including such a multi-functional compound may lead to a case where the adhesiveness between the resulting protective films and the resinous substrate as well as the wear resistance of the resultant protective films can be improved.

It is preferable that a number of the radically-polymerizable unsaturated groups in the multi-functional unsaturated compound can be 3 or more within one molecule, and can more preferably be from 4 to 20, in order not to decline the resulting wear resistance.

As for a blending proportion of the multi-functional unsaturated compound, it is preferable to set it at 20 parts by mass or less with respect to a sum of Component (A), Component (B) and Component (C) being taken as 100 parts by mass, from the standpoint of preventing the resulting weatherability from worsening.

As for the multi-functional unsaturated compound, a compound having two or more (meth)acryloyl groups within one molecule is preferable. As for its concrete examples, the following compounds can be given: bisphenol A-alkylene oxide adduct di(meth)acrylate, bisphenol F-alkylene oxide adduct di(meth)acrylate, bisphenol Z-alkylene oxide adduct di(meth)acrylate, bisphenol S-alkylene oxide adduct di(meth)acrylate, thiobisphenol-alkylene oxide adduct di(meth)acrylate, bisphenol A di(meth)acrylate, bisphenol F di(meth)acrylate, bisphenol Z di(meth)acrylate, bisphenol S di(meth)acrylate, thiobisphenol di(meth)acrylate, tricyclodecanedimethylol di(meth)acrylate, ethylene glycol di(meth)acrylate, polyethylene glycol di(meth)acrylate, propylene glycol di(meth)acrylate, polypropylene glycol di(meth)acrylate, neopentyl glycol di(meth)acrylate, 1,6-hexanediol di(meth)acrylate, 1,9-nonanediol di(meth)acrylate, glycerine di(meth)acrylate, glycerine-alkylene oxide adduct di(meth)acrylate, dimer acid diol di(meth)acrylate, cyclohexanedimethylol di(meth)acrylate, trimethylolpropane tri(meth)acrylate, trimethylolpropane-alkylene oxide adduct tri(meth)acrylate, pentaerythritol tri- and tetra-acrylates, pentaerythritol-alkylene oxide adduct tri- and tetra-acrylates, ditrimethylolpropane tetra(meth)acrylate, dipentaerythritol hexa- and penta-acrylates, polyester (meth)acrylate, epoxy (meth)acrylate, urethane (meth)acrylate, and silicone resins having a (meth)acryloyl group at the ends.

As for the polyester (meth)acrylate, dehydrated condensates between polyester polyol and (meth)acrylic acid can be named. As for the polyester polyol, reaction products between low-molecular-weight polyols and dicarboxylic acids and their anhydrides can be named. Moreover, the low-molecular-weight polyols can be ethylene glycol, polyethylene glycol, cyclohexanedimethylol, 3-methyl-1,5-pentanediol, propylene glycol, polypropylene glycol, 1,6-hexanediol, and trimethylolpropane, as well as alkylene oxide adducts of these low-molecular-weight polyols. In addition, the dicarboxylic acids can be adipic acid, succinic acid, phthalic acid, hexahydrophthalic acid, and terephthalic acid. Moreover, dehydrated condensates between various dendrimer-type polyols and (meth)acrylic acid can be named.

As for the epoxy (meth)acrylate, the following can be given: (meth)acrylic acid adducts of bisphenol type-A epoxy resins, (meth)acrylic acid adducts of hydrogenated bisphenol type-A epoxy resins, (meth)acrylic acid adducts of phenol or cresol novolac-type epoxy resins, (meth)acrylic acid adducts of biphenyl-type epoxy resins, (meth)acrylic acid adducts to diglycidyl ether of polyether, such as polytetramethylene glycol, (meth)acrylic acid adducts to diglycidyl ether of polybutadiene, (meth)acrylic acid adducts of internal epoxide in polybutadiene, (meth)acrylic acid adducts of silicone resins having an epoxy group, (meth)acrylic acid adducts of limonene dioxide, and (meth)acrylic acid adducts of 3,4-epoxycyclohexylmethyl-3,4-epoxycyclohexanecarboxylate.

As for the urethane (meth)acrylate, the following can be given: compounds in which organic polyisocyanate and hydroxyl group-containing (meth)acrylate have undergone an addition reaction; and compounds in which organic polyisocyanate, polyol and hydroxyl group-containing (meth)acrylate have undergone an addition reaction.

Here, as for some of the polyols, the following can be given: low-molecular-weight polyols, polyether polyol, polyester polyol, and polycarbonate polyol.

As for some of the low-molecular-weight polyols, the following can be given: ethylene glycol, propylene glycol, neopentyl glycol, cyclohexanedimethylol, 3-methyl-1,5-pentanediol, and glycerin.

As for the polyether polyol, polypropylene glycol, and polytetramethylene glycol can be named.

As for the polyester polyol, reaction products can be named, reaction products which are made between those low-molecular-weight polyols (and/or the polyether polyols) and dicarboxylic acids, such as adipic acid, succinic acid, phthalic acid, hexahydrophthalic acid and terephthalic acid, or their anhydrides.

As for the organic polyisocyanate, the following can be given: tolylene diisocyanate, xylylene diisocyanate, tetramethylxylylene diisocyanate, 4,4'-diphenylmethane diisocyanate, 4,4'-dicyclohexylmethane diisocyanate, hexamethylene diisocyanate, and isophorone diisocyanate.

As for the hydroxyl group-containing (meth)acrylate, the following can be given: hydroxyalkyl (meth)acrylate, such as 2-hydroxyethyl (meth)acrylate, 2-hydroxypropyl (meth)acrylate, and 4-hydroxybutyl (meth)acrylate; or hydroxyl group-containing multi-functional (meth)acrylate, such as pentaerythritol tri(meth)acrylate, and dipentaerythritol penta (meth)acrylate.

It is also allowable to use one of the above-enumerated unsaturated compounds independently, or it is even permissible to use two or more of them combinedly.

For the purpose of reducing warpage at the time of curing while maintaining transparency, and the like, it is also possible to further blend an organic polymer into the composition. As for a suitable polymer, (meth)acryl-based polymers can be named. As for a suitable constituent monomer, the following can be given: methyl (meth)acrylate, cyclohexyl (meth)acrylate, (meth)acrylic acid, glycidyl (meth)acrylate, and N-(2-(meth)acryloxyethyl)tetrahydrophthalimide. In a case where polymers are made by copolymerizing (meth)acrylic acid, it is also advisable to introduce a (meth)acryloyl group into the polymer chain by adding glycidyl (meth)acrylate to it.

Substrate

In the member for vehicle according to the present invention, the resinous substrate is not limited particularly regarding its material quality and configuration. For example, the following can be given: polycarbonate resins, polymethyl methacrylate, polyethylene terephthalate, polyvinyl chloride, epoxy resins, and polyurethane resins. Among them, polycarbonate is preferable. Since polycarbonate exhibits transparency and impact resistance sufficiently, it is suitable as window glasses for vehicle.

Protective Film

The thicker the thickness of the resulting protective films is, the more the weatherability upgrades. However, making it too thick is not desirable, from the appearance of the resultant protective films and from the standpoint of productivity. Taking weatherability, appearance and productivity into consideration, it is desirable that the film thickness of the resulting protective films can be set at from 5 to 50 μm, or furthermore at from 10 to 40 μm.

Note that, in the member for vehicle according to the present invention, excellent adhesiveness can be demonstrated without ever forming any undercoating layer, or the like, between the resinous substrate and the protective film.

Manufacturing Process for Member for Vehicle

Hereinafter, explanations will be made on a manufacturing process for member for vehicle according to the present invention. A manufacturing process for member for vehicle according to the present invention mainly includes a preparation step, an application step, and a curing step.

The preparation step is a step of preparing the above-mentioned composition by setting the respective components at a predetermined blending proportion, respectively. It is possible to produce the composition by weighing Components (A) through (F), which have been explained already, as well as the other components, such as Component (G) and Component (H), if needed, in a predetermined amount, respectively, and then stirring and mixing them.

The application step is a step of applying the composition onto a surface of a resinous substrate partially at least.

It is allowable to follow conventional methods to do a coating method for the composition. For example, the following are preferable: spraying methods, spin coating methods, dip coating methods, bar coating methods, and flow coating methods; and it is permissible to select one of them depending on configurations of the resinous substrate. On this occasion, when the surface of the substrate is made so as not to be exposed to the composition for a long period of time, degradations of the substrate due to organic solvents can be inhibited.

Although a film thickness of the resulting coated films being formed by means of coating depends on a proportion of solid contents being included in the composition, it is advisable to appropriately select the thickness in compliance with a thickness of obtainable protective films. For example, it is allowable to set a film thickness of the resultant coated films (before being dried and cured) at from 6 to 100 μm. Note that, when the post-drying or post-curing thickness is insufficient, it is permissible to further carry out the steps from applying to curing repeatedly.

It is also allowable to further carry out a drying step of drying the coated film between the application step and the curing step. At the drying step, it is permissible to dry Component (F) by means of drying naturally or heating.

It is advisable to appropriately select a temperature for drying the coated films depending on heat resistance of the resinous substrate, and the temperature can be the softening point of resin or less. For example, in a case where the resinous substrate is made of polycarbonate resin, it is preferable to set the temperature within a range of from 50 to 120° C.

The curing step is a step of curing the composition (or coated films), thereby forming a protective film on the surface of the resinous substrate.

In a case where the composition is a light curing-type composition, it is advisable to dry the composition after it is applied onto the resinous substrate, and then to irradiate it with light, such as ultraviolet rays. As for a preferable manufacturing method, it is possible to name a method in which the post-drying resinous substrate is irradiated with light in such a state that it is maintained at high temperatures.

In a case where the composition is a light curing-type composition, as for the temperature when irradiating the composition with an ultraviolet ray, and the like, after drying it, although the temperature shall not be limited especially as far as it is a temperature or less at which the performance of substrate materials can be maintained, it can preferably fall within a range of from 50° C. to 200° C. For example, in the case of polycarbonate resin, it is preferable to set the temperature within a range of from 50 to 120° C., more preferably from 60 to 110° C., much more preferably, from 70 to 100° C., and especially preferably, from 80 to 100° C. By maintaining a temperature of the resinous substrate within a range of from 50 to 120° C. when irradiating it with ultraviolet rays, it is possible to enhance the wear resistance of the resulting protective films.

As for some of the light, although ultraviolet rays and visible rays can be named, ultraviolet rays are preferable especially.

As for some of ultraviolet irradiation devices, high pressure-mercury lamps, metal halide lamps, electrodeless UV lamps, and LEDs can be named. In the case of electrodeless UV lamps, it is possible to suitably employ those of new types, too, that are operated by means of current resulting from direct-current power source.

An irradiation energy shall be set up appropriately depending on the types of active energy rays or the blending compositions. However, the following can be given as one of such examples in a case where a high-pressure mercury lamp is employed: the irradiation energy can preferably be from 100 to 10,000 mJ/cm$^2$, or more preferably, from 1,000 to 6,000 mJ/cm$^2$, by irradiation energy in UV-A region.

In a case where the composition is a thermo curing-type composition, it is advisable to dry the composition after it is applied onto the resinous substrate, and then to heat it furthermore. As for a heating temperature, although it shall not be limited especially as far as it is a temperature or less at which the performance of substrate materials can be maintained, it can preferably be from 80 to 200° C.

As for a heating time, it can preferably be from 10 minutes or more to 120 minutes or less. When viewing it from the standpoint of productivity, it is advisable to set it at 60 minutes or less, or furthermore at 30 minutes or less.

Note that it is also allowable to carry out the curing of the composition in air, or it is even permissible to carry it out in a vacuum, or in an inert-gas environment. Although it is preferable to carry out the curing in a vacuum, or in an inert-gas atmosphere, in view of prospective performance of the resulting protective films, it is also advisable to carry it out in air, from the viewpoint of productivity.

In the present description, the temperatures for drying and heating are the superficial temperature of coated films, and are virtually equal to an atmospheric temperature in the drying or heating.

As for usage of the member for vehicle according to the present invention, the following can be given: interior/exterior members for vehicle, such as automobile, industrial vehicle, personal vehicle, automotive body being capable of self-propelling, and railroad vehicle; exterior plates for vehicle; and resinous windows.

As for some of the exterior members, the following can be given: door moldings, frameworks for door mirror, wheel covers, spoilers, bumpers, turn-signal lenses, pillar garnishes, rear finishers, and head-lamp covers.

As for some of the interior members, the following can be given: instrument panels, console boxes, meter covers, door-lock bezels, steering wheels, power-window switch bases, center clusters, dashboards, and bonnets.

As for some of the exterior plates, the following can be given: front fenders, door panels, roof panels, hood panels, trunk lids, and back-door panels.

As some of the resinous windows, the following can be given: sunroofs, front glasses, side glasses, rear glasses, rear quarter glasses, and rear-door quarter glasses.

So far, explanations have been made on some of the embodiment modes of the member for vehicle according to the present invention. However, the present invention is not one which is limited to the aforementioned embodiment modes. It is possible to execute the present invention in various modes, to which changes or modifications that one of ordinary skill in the art can carry out are made, within a range not departing from the gist.

EXAMPLES

Hereinafter, examples and comparative examples will be exhibited, thereby explaining the present invention in more detail. Note that the present invention shall not be limited at all by these examples.

In what follows, "parts" means parts by mass, and "%" means % by mass.

Moreover, multi-functional urethane (meth)acrylates other than aforementioned Component (A), which do not correspond to Component (A), will be hereinafter referred to as Component (A)'. In addition, colloidal silicas (i.e., involatile components from which dispersion media were got rid of), which did not correspond to aforementioned Component (C), will be referred to as Component (C)'.

(1) Production Example No. 1

Production of Component (A) ("HDI3-HBA")

The following were charged into a 3-L separable flask, which was equipped with a stirring device and an air-blowing tube: an isocyanate compound (e.g., "TPA-100," DURANATE produced by ASAHIKASEI CHEMICALS Co., Ltd., whose NCO content was 23%) whose major component was a nurate-type trimer of hexamethylene diisocyanate in an amount of 1,369.5 g (i.e., 7.5-mol NCO); 1.22-g 2,6-di-tert-butyl-4-methylphenol (hereinafter, being referred to as "BHT"); and 0.73-g dibutyl tin dilaurate (hereinafter, being referred to as "DBTL"). Then, 1,080-g (i.e., 7.5-mol) 4-hydroxybutyl acrylate (hereinafter, being referred to as "HBA") was dropped into them while stirring them at a liquid temperature of from 50 to 75° C.

After completing the dropping, they were further stirred at 80° C. for 4 hours, and their reactions were terminated after confirming the disappearance of isocyanate groups in the resulting reaction product by IR (or infrared absorption) analysis, thereby obtaining an isocyanuric ring-containing urethane (meth)acrylate compound. Hereinafter, this reaction product will be called "HDI3-HBA."

Note that "HDI3-HBA" corresponded to a compound in which all of $R^1$, $R^2$ and $R^3$ were a tetramethylene group, respectively, and all of $R^4$, $R^5$ and $R^6$ were a hydrogen atom, respectively, in said General Formula (1).

(2) Production Example No. 2

Production of Component (A)' ("IPDI-M305")

The following were charged into a 2-L separable flask, which was equipped with a stirring device and an air-blowing tube: 993-g pentaerythritol tri- and tetra-acrylates (containing tri-acrylate in an amount of 2 mol) (e.g., "M-305," ARONIX produced by TOAGOSEI Co., Ltd., hereinafter, being referred to as "M-305"); 0.61-g "BHT"; and 0.36-g "DBTL." Then, 222-g (i.e., 1.0-mol) isophorone diisocyanate (hereinafter, being referred to as "IPDI") was dropped into them while stirring them at a liquid temperature of from 70 to 75° C.

After completing the dropping, they were further stirred at 85° C. for 2 hours, and their reactions were terminated after confirming the disappearance of isocyanate groups in the resulting reaction product by IR (or infrared absorption) analysis, thereby obtaining a multi-functional urethane acrylate.

Hereinafter, this reaction product will be called "IPDI-M305."

(3) Production Example No. 3

Production of Component (c1) ("THPI-Alkoxysilane")

The following were charged into a 3-L separable flask, which was equipped with a stirrer: 1, 119-g toluene; and 456-g (i.e., 3.0-mol) 3,4,5,6-tetrahydrophthalic anhydride. Then, 663-g (i.e., 3.0-mol) 3-aminopropyltriethoxysilane was dropped into them in the presence of nitrogen while stirring them at room temperature. After completing the dropping, they were increased in the temperature until ethanol was distilled away, and subsequently they were further reacted for 4 hours while keeping the reaction liquid within a range of from 85 to 110° C.

After completing their reactions, low-boiling-point components, such as toluene and ethanol, were distilled away by decompression while heating the flask in an 80° C. oil bath, thereby synthesizing an alkoxysilane compound (c1). Hereinafter, this reaction product will be called "THPI-Alkoxysilane."

It was ascertained by means of $^1$H-NMR spectrum that the thus obtained "THPI-Alkoxysilane" had a structure that was made of a compound according to said General Formula (3) wherein $R^{13}$ was an ethyl group, $R^{14}$ was a 1,3-propylene group (or trimethylene group), and "z" was 1.2.

The resulting "THPI-Alkoxysilane" was employed as a raw material (c1) in later-described Production Example No. 4.

(4) Production Example No. 4

Production of Component (C) ("THPI-Silica")

The following were charged into a 3-L separable flask, which was equipped with a stirrer: 960-g propylene glycol monomethylether (hereinafter, being referred to as "PGM"); 23.6-g water; and an isopropyl alcohol (hereinafter, being referred to as "IPA")-dispersion colloidal silica (e.g., "IPA-ST," a product of NISSAN CHEMICAL INDUSTRIES, Ltd., which exhibited an average particle diameter of from 10 to 15 nm (e.g., values be ing calculated from the specific surface areas according to the BET method), had solid contents in an amount of 30%, and contained "IPA" in an amount of 70%; hereinafter, being simply referred to as "IPA-ST") in an amount of 800 g. Then, after uniformizing them by stirring, 189-g "THPI-Alkoxysilane" was further charged into the flask, and was then dissolved in them by stirring at room temperature. On this occasion, a mass ratio between Component (c1) and Component (c2) was 44:56.

After heating this colloidal dispersion liquid at 80° C. in the presence of nitrogen to react it for 4 hours, it was condensed by distilling IPA, water, and the like, away until the resulting nonvolatile component accounted for 35%. Subsequently, 640-g "PGM" was further added to it, and then a small amount of water, and so forth, which remained in the reaction system, was further distilled away along with "PGM," and so on, thereby obtaining reaction products with 35% nonvolatile component. Hereinbelow, of the reaction products being obtained herein, the nonvolatile component (i.e., Component (C)), from which solvents etc. were got rid of, will be called "THPI-Silica."

Preparation of Light Curing-Type Coating-Agent Compositions

An ordinary method was followed to stir and then mix components shown in Table 1 and Table 3, thereby producing light curing-type coating-agent compositions. Compositions according to the respective examples (i.e., #E1 through E4) are given in Table 1, and compositions according to the respective comparative examples (i.e., #C1 through C8) are given in Table 3.

Note that numeric values of the respective components in Table 1 and Table 3 are expressed as the numbers of parts by mass. Moreover, abbreviations in the tables express the following compounds.

ABBREVIATIONS (i) Component (A)
"HDI3-HBA": Reaction Product according to Production Example No. 1

(ii) Component (A)'
"IPDI-M305": Reaction Product according to Production Example No. 2

(iii) Component (B)
"M-315": "M-315," ARONIX produced by TOAGOSEI Co. Ltd., i.e., tris(acryloyloxyethyl)isocyanurate, corresponding to a compound wherein: $R^7$, $R^8$ and $R^9$ is an ethylene group, respectively; $R^{10}$, $R^{11}$ and $R^{12}$ is a hydrogen atom, respectively; $n^1$, $n^2$ and $n^3$ is 1, respectively; and $n^1+n^2+n^3=3$ in said General Formula (2);

(iv) Component (C)
"THPI-Silica": Reaction Product (or Nonvolatile Component) according to Production Example No. 4;

(v) Component (C)'
"Acryl-Silica": Nonvolatile Component in methyl ethyl ketone (hereinafter, being referred to as "MEK")-dispersion Acryl-modified Colloidal Silica, a product of NISSAN CHEMICAL INDUSTRIES, Ltd., under Trade Name of "MEK-AC-2101" exhibiting an average particle diameter of from 10 to 15 nm (e.g., values being calculated from the specific surface areas according to the BET method), having solid contents in an amount of 33%, and containing "MEK" in an amount of 67%;

(vi) Component (D)
"Irg-819": Photo Radical-polymerization initiator produced by BASF Co., Ltd., under Trade Name of "IRGACURE 819," namely, bis(2,4,6-trimethylbenzoyl)-phenylphosphine oxide;

(vii) Component (E)
"RUVA-93": Benzotriazole-based Ultraviolet Absorber having a methacryloyl group, a product of OTSUKA KAGAKU Co., Ltd., under Trade Name of "RUVA-93," namely, 2-[2-hydroxy-5-(2-methacryloyloxyethyl) phenyl]-2H-benzo triazole;

(viii) Component (F)
"PGM": Propylene Glycol Monomethylether; and
"MEK": methyl ethyl ketone (or "MEK" in "MEK-AC-2101" according to said Component (C)');

(ix) Component (G)
"T-123": Hindered Amine-based Light Stabilizer, a product of BASF Co., Ltd., under Trade Name of "TINUVIN 123," namely, decanedioic acid bis(2,2,6,6-tetramethyl-1-(octyloxy)-4-piperidinyl) ester; and (x) Component (H)
"8019add": Silicone-based Surface Modifier (or leveling agent), a product of DOW CORNING TORAY Co., Ltd., under Trade Name of "8019 ADDITIVE," with 100% Effective Ingredient Note that the colloidal silica's average particle diameter is an average primary particle diameter, and the phrase, "from 10 to 15 nm," is a catalogue value for which the dispersions or variations between the product's lots are taken into account.

Structures of effective ingredients in Component (E) and Component (G) are illustrated below.

(Chemical Formula 8)

(RUVA-93)

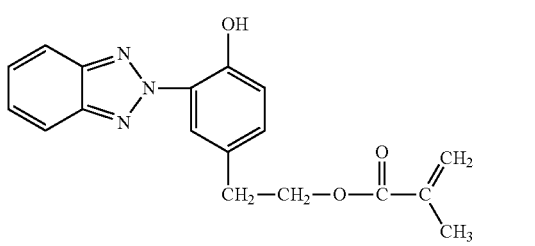

(Chemical Formula 9)

(T-123)

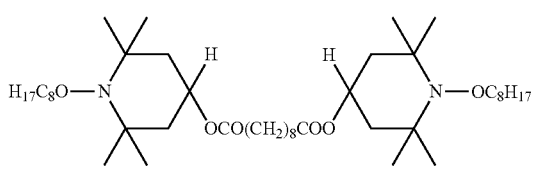

Making of Protective Films

Compositions shown in Table 1 and Table 3 were applied onto a surface of a 10-cm square polycarbonate resin plate, respectively, using a bar coater so that a post-drying paint-film thickness became from 15 to 35 µm approximately. After drying the resulting paint films at 100° C. for 10 minutes using a hot-air dryer, an ultraviolet irradiation operation was immediately carried out onto the paint films whose paint-film superficial temperature was 90° C., thereby making samples (i.e., Example Nos. 1 through 4, and Comparative Example Nos. 1 through 8) each of which was equipped with a protective film on one of the surfaces of the resin plate.

For the ultraviolet irradiation operation, a high-pressure mercury lamp produced by EYE GRAPHICS Co., Ltd. was employed. The lamp output, lamp height and conveyor speed were adjusted so as to make the peak illumination intensity 400 mW/cm$^2$, and so as to make the irradiation energy per one pass 250 mJ/cm$^2$ in the region of UV-A according to UV POWER PUCK produced by EIT Corp., and the lamp was then put into operation to irradiate the cured films with ultraviolet rays for 12 passes (i.e., 3,000 mJ/cm$^2$ in total).

For the obtained protective films, the transparency, (initial) adhesiveness, wear resistance, weatherability (e.g., weathered adhesiveness and presence or absence of cracks), and scratch resistance were evaluated by methods being described below. Those evaluation results are given in Table 2, Table 4 and Table 5.

(I) Initial Adhesiveness

The cured films were provided with 11 slits by cutting at intervals of 2 mm onto each of the longitudinal and lateral sides using a cutter knife, thereby forming 100 grid-shaped square elements, respectively. Thereafter, pursuant to JIS K5400, a cellophane tape produced by NICHIBAN Co., Ltd. was stuck onto the grid-shaped square elements, and then the cellophane tape was peeled off, respectively. The adhesiveness was evaluated by a proportion of residual films after peeling off the cellophane tape (that is, a number of remained grid-shaped square elements (units: %)).

(II) Transparency

Pursuant to JIS K7136, the haze H (%) of the protective films was measured for every substrate using "NDH-2000," a turbidimeter produced by NIHON DENSHOKU KOGYO. The smaller the H value was, the more satisfactorily the transparency was evaluated.

(III) Wear Resistance

A Taber-type wear test was carried out in compliance with ASTM D-1044. The wear resistance was evaluated by measuring the haze difference ΔH (%) between the values before and after the Taber-type wear test in which a Taber-type wear tester was employed. Note herein that the wear wheel was CS-10F, each of the loads was set at 500 g, and the number of rotations was set at 500 times. The smaller the ΔH (%) was, the more satisfactorily the wear resistance was evaluated.

(IV) Weatherability

Pursuant to JIS K5400, an accelerated test was carried out for 5,000 hours using a carbon arc-type sunshine weather-ometer, thereby evaluating the adhesiveness (or weathered adhesiveness) and the presence or absence of cracks for every 500 hours. Note that the adhesiveness was judged to be satisfactory in the protective films from which the protective film was not peeled off when a cellophane tape was stuck onto and then peeled off from the post-accelerated-test protective film. Moreover, regarding the cracks, those in which no cracks were discovered by visual observation were judged to be satisfactory. The results are shown in Table 2 and Table 4. In the respective tables, there are set forth the numbers of the longest time of the testing times in the accelerated test being carried out for protective films that were ascertained to be satisfactory with regard to the adhesiveness and cracks. Those with a greater number of hours were evaluated to be more satisfactory in terms of the weatherability. Regarding those which received a satisfactory evaluation after the accelerated test for 5,000 hours, they are noted by a symbol, "5000<," respectively.

(V) Scratch Resistance

For Example Nos. 1 through 4, Comparative Example No. 3 and Comparative Example No. 8, the scratch resistance was evaluated. Luster values (e.g., at 20°) were measured for the respective protective films to find the difference before and after a scratch test, thereby evaluating the scratch resistance by a luster retention rate.

The scratch test was carried out by scratching the protective film with a load of 500 g for 150 times back and forth reciprocally using a water-moistened Nylon scrubbing brush with abrasive (e.g., "SCOTCH BRIGHT No. 96" produced by SUMITOMO 3M Co., Ltd.). The protective films before and after the scratch test were subjected to a measurement for the luster retention rate using a "GAKUSHIN"-type rubbing tester, a product of DAIEI KAGAKU SEIKI Co., Ltd., for the fastness of dyed article. Results of the measurement are shown in Table 5. The results show that the higher luster retention rate they have the more satisfactory the scratch resistance was.

As shown in Table 2, Example Nos. 1 through 4 were excellent in terms of the transparency, adhesiveness, wear resistance and weatherability. Of these, Example No. 1 being made by using #E1 exhibited such satisfactory weathered adhesiveness as 5,000 hours. Moreover, Example No. 2 being made by using #E2, in which the amount of Component (B) in #E1 was increased from 15 parts to 30 parts and the amount of Component (A) was reduced by that extent, exhibited such weathered adhesiveness that was upgraded up to exceeding 5,000 hours, and exhibited more upgraded wear resistance as well. Example No. 3 being made by using #E3, in which the amount of Component (B) was further increased up to 50 parts, exhibited more upgraded wear resistance, and was excellent exceptionally in terms of the weatherability in the same manner as Example No. 2.

When the amount of the UV absorber serving as Component (E) was increased in order to maintain the weathered adhesiveness in a case where the coated thickness became thinner, the resulting wear resistance declined. However, as indicated in Example No. 4, the wear resistance was satisfactory and the weatherability was satisfactory exceptionally when the amounts of Component (E) and Component (C) were set at 7.5 parts and 15 parts, respectively. Note herein that the weathered adhesiveness declined slightly in Example No. 5 being made by using #E5 in which the acryl-modified colloidal silica serving as Component (C)' was used combinedly along with Component (C).

On the contrary, Comparative Example No. 1 being made by using #C1, which did not include any Component (A) but in which Component (B) was present excessively, exhibited poorer weathered adhesiveness, as shown in Table 4. Moreover, Comparative Example No. 2 being made by using #C2, which did not include any Component (B), exhibited faulty initial adhesiveness. Comparative Example No. 3 being made by #C3, which did not include any Component (C), exhibited faulty wear resistance. Comparative Example No. 4 being made by #C4, which did not include any Component (E), exhibited worse weatherability. In Comparative Example No. 5 being made by using #C5 in which Component (C) was blended excessively, the wear resistance had worsened, and furthermore the weatherability had also worsened. As described above, it was important to blend Component (A), Component (B), Component (C) and Component (E) in an appropriate amount, respectively.

Although Comparative Example No. 6 in Table 4 was made by using #C6 which employed a multi-functional urethane acrylate (i.e., Component (A)') whose wear resistance was satisfactory even when it did not include any inorganic fine particles, the weatherability was faulty. Comparative Example No. 7 being made by using #C7, in which aforementioned Component (A)', instead of Component (C), was employed as a wear-resistance improving agent, was faulty not only in terms of the wear resistance but also in terms of the weatherability.

Comparative Example No. 8 in Table 4 was an example employing #C8 in which Component (C)' (or "Acryl-Silica") substituted for Component (C) (or "THPI-Silica") in #E4, and corresponds to the composition that is set forth in above-described Patent Literature No. 4. In Comparative Example No. 8, the wear resistance was satisfactory, however, the weathered adhesive was poorer.

Table 5 shows results of another scratch resistance test by means of testing method that differed from the Taber wear test. As shown in Table 5, the luster retention rate of Comparative Example No. 3 being made by using #C3, which neither included Component (C) nor Component (C)', was bad exceptionally. On the contrary, Example Nos. 1 through 4 and Comparative Example No. 8, in which the superficially-modified colloidal silica was employed, produced a favorable result, respectively. Hence, for Example Nos. 1 through 3 being made by using the compositions according to #E1 through #E3 whose content proportion of Component (C) was identical to each other, an Si amount within the resulting protective films was measured, respectively. Hereinafter, the measurement method will be explained.

First of all, the circumference of each of the samples was fixated with an epoxy resin. Those samples were ground until it became possible to ascertain the protective film's thickness. Thereafter, in order to nullify influences that the grinding abrasive particles exerted on analyzed values, an observation part in the respective protective films' cross section, which was exposed by means of the grinding, was machined with use of a focused beam of ion (or FBI). A point analysis was then performed for the observation parts, respectively, from the protective films' outermost surface down to the substrate's surface along the films' thicknesswise direction (i.e., a direction being perpendicular to the substrates' surface), with use of an SEM (i.e., scanning electron microscope) observation and EDX analysis (i.e., energy dispersion-type fluorescent X-ray analysis) by means of SEM/EDX, thereby obtaining an Si concentration in each of the parts whose depth differed one another from the films' surface, respectively.

Figure 3:
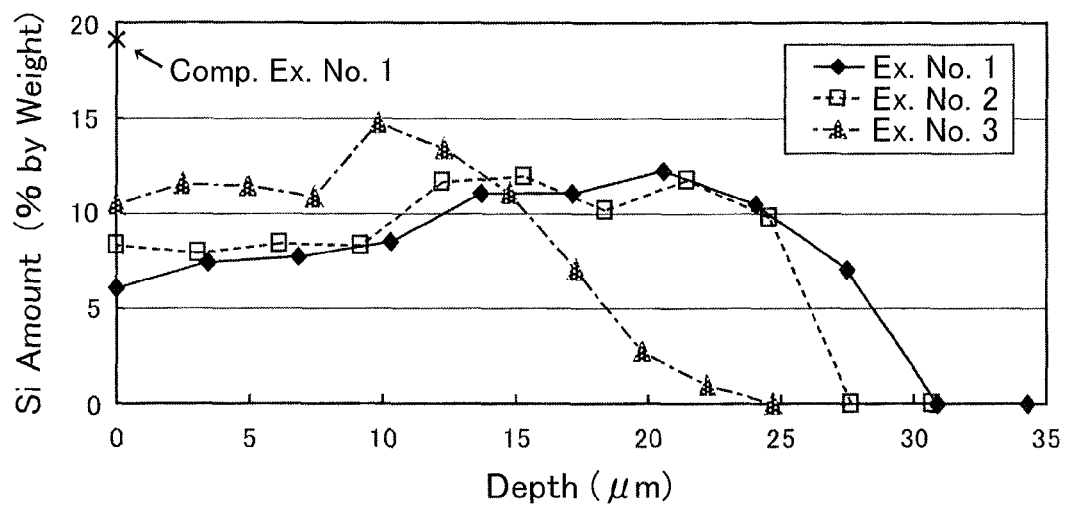
FIG. 3 is a graph that illustrates Si concentrations, which were examined for protective films that a member for vehicle according to the present invention comprised, in the outermost surface, and at predetermined depth positions from the outermost surface.

In FIG. 3, results of an elemental analysis by means of the SEM/EDX are illustrated. FIG. 3 is a graph that illustrates Si amounts (% by mass) in the protective films' outermost surface, and at predetermined depth positions from the outermost surface. In FIG. 3, an Si concentration in the outermost surface of Comparative Example No. 1 is also illustrated, along with those above, for reference.

From FIG. 3, the Si concentration in the protective films' outermost surface was the highest in the protective film of Comparative No. 1 being made by using #C1 in which the content of Component (B) was the highest. And, the greater Component (B) was, the higher the Si concentration in the outermost surface tended to become.

The film thickness of the protective films in Example Nos. 1 through 3, which was calculated from their SEM images by measuring them actually, was about 31 μm, about 28 μm and about 23 μm, respectively, in this order. It was understood from the graph in FIG. 3 that, in any one of the protective films, the Si concentration decreased in the vicinity of the substrates' surface so that Si came to be hardly detected. In Example No. 1, the Si concentration became the maximum at around a position where the depth went beyond 20 μm from the protective film's surface, and then the Si concentration decreased at positions, where the depth was deeper than that, as they approached the substrate's surface. In Example No. 2, the Si concentration became the maximum at an about—15-μm position from the protective film's surface, and the Si concentration decreased sharply in an interval from the substrate's surface and up to 3 μm approximately. In Example No. 3, the Si concentration became the maximum at an about—10-μm position from the protective film's surface, the Si concentration decreased at positions, where the depth was deeper than that, as they approached the substrate's surface, and the Si concentration was hardly detected in the vicinity of the substrate.

Note that the Si distribution in Comparative Example No. 1 is not illustrated in FIG. 3. However, of the protective film whose thickness was about 25 μm, the Si concentration became the maximum at an about—2-μm position from the surface. In a range where a depth was from 2 to 6 μm from the surface, the Si concentration decreased sharply, and Si was hardly detected in a region of from the substrate's surface and up to 10 μm. In other words, it is believed that making the content of Component (B) higher resulted in making Si approach the protective film's surface; as a result, it was possible to enhance the scratch resistance.

Relative Si amounts were calculated by calculating areas being made of ranges that were surrounded by the horizontal axis and vertical axis of the graph in FIG. 3 and by the lines thereof connecting the respective values one another. As a result, in Example No. 1 and Example No. 2, there was not any great difference between the Si amount in the surface-side film and the Si amount in the substrate-side film when the protective film was divided into the two halves by the film thickness. On the other hand, in Example No. 3, the Si amount in the surface-side film was more than twice as much as the Si amount in the substrate-side. That is, it was understood that it is possible to make the Si amount in the surface-side film greater than the Si amount in the substrate-side film by setting the content of Component (B) at 40 parts by mass or more, or furthermore at from 45 to 55 parts by mass.

TABLE 1

| | | Composition No. | | | |
|---|---|---|---|---|---|
| | | #E1 | #E2 | #E3 | #E4 |
| (A) | HDI3-HBA | 75 | 60 | 40 | 35 |
| (B) | M-315 | 15 | 30 | 50 | 50 |
| (C) | THPI-Silica | 10 | 10 | 10 | 15 |
| (D) | Irg-819 | 2 | 2 | 2 | 2 |
| (E) | RUVA-93 | 5 | 5 | 5 | 7.5 |
| (F) | PGM | 110 | 110 | 110 | 110 |
| (G) | T-123 | 0.5 | 0.5 | 0.5 | 0.5 |
| (H) | 8019add | 0.1 | 0.1 | 0.1 | 0.1 |

TABLE 2

| | | Sample No. | | | |
|---|---|---|---|---|---|
| | | #01 | #02 | #03 | #04 |
| Composition No. | | #E1 | #E2 | #E3 | #E4 |
| Initial State | Transparency, H (%) | 0.3 | 0.3 | 0.3 | 0.3 |
| | Adhesiveness, Residual Film (%) | 100 | 100 | 100 | 100 |
| Wear Resistance, ΔH (%) | | 7.4 | 5.7 | 4.7 | 6.1 |
| Weather-Ability | Adhesiveness (hour) | 5000 | 5000< | 5000< | 5000< |
| | Cracks (hour) | 5000< | 5000< | 5000< | 5000< |

TABLE 3

| | Composition No. | #C1 | #C2 | #C3 | #C4 | #C5 | #C6 | #C7 | #C8 |
|---|---|---|---|---|---|---|---|---|---|
| (A) | HDI3-HBA | | 90 | 70 | 60 | 30 | | 20 | 35 |
| (A)' | IPDI-M305 | | | | | | 100 | 50 | |
| (B) | M-315 | 90 | | 30 | 30 | 30 | | 30 | 50 |
| (C) | THPI-Silica | 10 | 10 | | 10 | 40 | | | |
| (C)' | Acryl-Silica | | | | | | | | 15 |
| (D) | Irg-819 | 2 | 2 | 2 | 2 | 2 | 2 | 2 | 2 |
| (E) | RUVA-93 | 5 | 5 | 5 | | 5 | 5 | 5 | 7.5 |
| (F) | PGM | 110 | 110 | 110 | 110 | 110 | 110 | 110 | 80 |
| | MEK | | | | | | | | 30 |
| (G) | T-123 | 0.5 | 0.5 | 0.5 | 0.5 | 0.5 | 0.5 | 0.5 | 0.5 |
| (H) | 8019add | 0.1 | 0.1 | 0.1 | 0.1 | 0.1 | 0.1 | 0.1 | 0.1 |

TABLE 4

| | Sample No. | #21 | #22 | #23 | #24 | #25 | #26 | #27 | #28 |
|---|---|---|---|---|---|---|---|---|---|
| | Composition No. | #C1 | #C2 | #C3 | #C4 | #C5 | #C6 | #C7 | #C8 |
| Initial State | Transparency, H (%) | 0.3 | 0.3 | 0.3 | 0.3 | 0.3 | 0.3 | 0.3 | 0.3 |
| | Adhesiveness, Residual Film (%) | 100 | 0 | 100 | 100 | 100 | 100 | 100 | 100 |
| Wear Resistance, ΔH (%) | | 5.7 | 8.7 | 15.5 | 4.2 | 9.8 | 7.3 | 13.3 | 6.8 |
| Weather-ability | Adhesiveness (hour) | 2500 | — | 5000< | 1000 | 3000 | 2000 | 3000 | 4000 |
| | Cracks (hour) | 5000< | — | 5000< | 3000 | 4000 | 2500 | 3500 | 5000< |

*Note that no weatherability test was conducted for #22 because it exhibited worse initial adhesiveness.

TABLE 5

| Sample No. | Composition No. | Luster Retention Rate (%) |
|---|---|---|
| #02 | #E2 (i.e., Ex. No 2) | 80 |
| #04 | #E4 (i.e., Ex. No. 4) | 80 |
| #23 | #C3 (i.e., Comp. Ex. No. 3) | 5 |
| #28 | #C8 (i.e., Comp. Ex. No. 8) | 85 |

Window Glass for Automobile

A concrete embodiment, in which a member for vehicle according to the present invention is used as a window glass (e.g., sunroof) for automobile, will be hereinafter explained using FIG. 1 and FIG. 2.

FIG. 1 is a perspective diagram that schematically illustrates the sunroof. The sunroof comprises a window glass 1, a sash-shaped frame 4 that supports the peripheral portion of the window glass 1. To the peripheral portions of the window glass 1 and frame 4, a loop-shaped weather strip 5, which is formed from a flexible material, is fitted in order to secure air tightness within the automobile. This sunroof is disposed so as to be openable and closable to an opening that is formed in a roof panel of the automobile.

Figure 2:
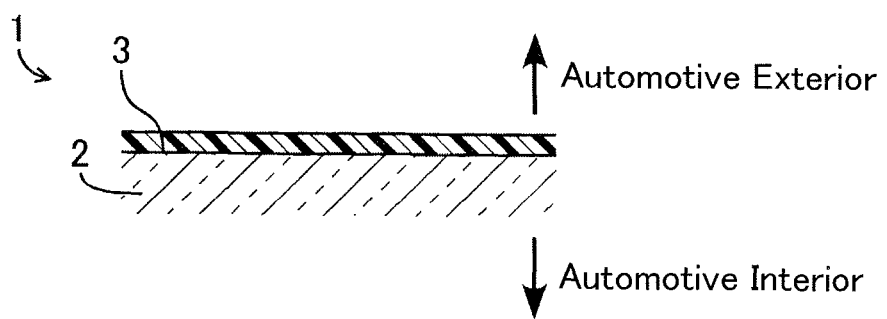
FIG. 2 is a cross-sectional diagram that illustrates a window glass, one of members for vehicle according to the present invention.

FIG. 2 is across-sectional diagram that schematically illustrates the window glass 1. The window glass 1 comprises a glass body 2, which is made of polycarbonate, and a protective film 3, which is formed on the automobile exterior-side surface of the glass body 2 at least. The protective film 3 is made by means of curing any one of Compositions #E1 through #E4 by the above-mentioned procedure.

The invention claimed is:

1. A member for vehicle,
comprising a resinous substrate and a protective film at least partially on a surface of the resinous substrate;
said protective film is formed by curing a curable coating-agent composition containing:
Component (A) in an amount of from 20 to 80 parts by mass;
Component (B) in an amount of from 10 to 70 parts by mass;
Component (C) in an amount of from 1 to 35 parts by mass;
a radical-polymerization initiator as Component (D) in an amount of from 0.1 to 10 parts by mass;
an ultraviolet absorber as Component (E) in an amount of from 1 to 12 parts by mass; and
an organic solvent as Component (F) in an amount of from 10 to 1,000 parts by mass;
with respect to a sum of the Component (A), the Component (B) and the Component (C) being taken as 100 parts by mass,
wherein Component (A) is an isocyanuric ring-containing urethane (meth)acrylate compound being expressed by the following Formula (1):

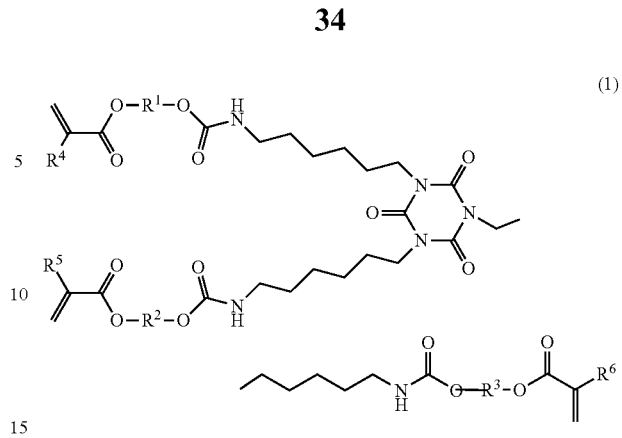

in Formula (1), each of $R^1$, $R^2$ and $R^3$ is a divalent organic group whose number of carbon atoms is from 2 to 10 independently; and each of $R^4$, $R^5$ and $R^6$ is a hydrogen atom, or a methyl group independently;

wherein Component (B) is an isocyanuric ring-containing tri(meth)acrylate compound being free from any urethane bond that is expressed by the following Formula (2):

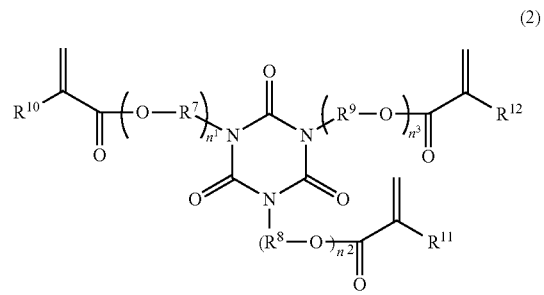

in Formula (2), each of $R^7$, $R^8$ and $R^9$ is a divalent organic group whose number of carbon atoms is from 2 to 10 independently; each of $R^{10}$, $R^{11}$ and $R^{12}$ is a hydrogen atom, or a methyl group independently; each of $n^1$, $n^2$ and $n^3$ is a number of from 1 to 3 independently; and $n^1+n^2+n^3$=from 3 to 9; and wherein Component (C) is an involatile component formed by reacting an alkoxysilane compound (c1) having Formula (3), with a colloidal silica (c2), wherein a mass ratio of (c1) to (c2) is from 9:1 to 1:9:

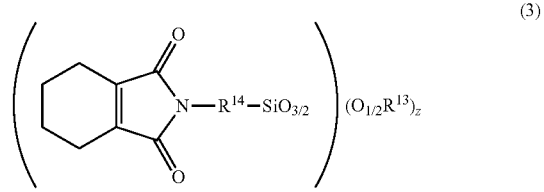

in Formula (3), each $R^{13}$ is independently a hydrogen atom, or a monovalent organic group; $R^{14}$ is a divalent hydrocarbon whose number of carbon atoms is from 1 to 6; and "z" is a positive number of from 0.1 or more to 3 or less; wherein, when "z" is less than 3, the alkoxysilane compound (c1) is a condensate.

2. The member for vehicle according to claim 1, wherein said Compound (E) includes a benzotriazole-based ultraviolent absorber having a (meth)acryloyl group.

3. The member for vehicle according to claim 1, wherein said colloidal silica (c2) has an average primary particle diameter of from 1 to 100 nm.

4. The member for vehicle according to claim 1, wherein $R^1$, $R^2$ and $R^3$ are a tetramethylene group, respectively; and $R^4$, $R^5$ and $R^6$ are a hydrogen atom, respectively in Formula (1) for said Component (A).

5. The member for vehicle according to claim 1, wherein $R^7$, $R^8$ and $R^9$ are an ethylene group, respectively; $R^{10}$, $R^{11}$ and $R^{12}$ are a hydrogen atom, respectively; $n^1$, $n^2$ and $n^3$ are 1, respectively; and $n^1+n^2+n^3=3$ in Formula (2) for said Component (B).

6. The member for vehicle according to claim 1, wherein said curable coating-agent composition further contains a hindered amine-based light stabilizer serving as Component (G) in an amount of from 0.05 to 1.5 parts by mass with respect to a sum of said Component (A), said Component (B) and said Component (C) being taken as 100 parts by mass.

7. The member for vehicle according to claim 1, wherein the curable coating-agent composition further contains a silicone-based and/or fluorine-based surface modifier as Component (H) in an amount of from 0.01 to 1.0 part by mass with respect to a sum of said Component (A), said Component (B) and said Component (C) being taken as 100 parts by mass.

8. The member for vehicle according to claim 1, wherein said Component (D) is a photo radical-polymerization initiator.

9. The member for vehicle according to claim 1, wherein said Component (C) is an involatile component obtained by a process comprising:
a step of adding an aminopropyltrialkoxysilane to a carboxylic acid anhydride having a double bond that is expressed by the following Formula (4), thereby turning them into an amic acid;
a step of turning said amic acid into a maleimide group by means of subjecting said amic acid to ring closing by heating, and subjecting an alkoxyl group to a hydrolytic condensation reaction with use of water that generates in the ring-closing reaction, thereby obtaining an alkoxysilane compound (c1) having said Formula (3); and
a step of reacting the obtained (c1) with the colloidal silica (c2) whose average primary particle diameter is from 1 to 100 nm by heating them in the presence of an organic solvent including water:

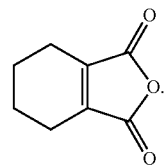

(4)

10. The member for vehicle according to claim 1, wherein said protective film is in contact with the surface of the resinous substrate.

11. The member for vehicle according to claim 1 being a resinous window for vehicle.

12. The member for vehicle according to claim 1 being an interior/exterior member for vehicle.

13. A manufacturing process for a member for a vehicle excellent in terms of weatherability and wear resistance, the manufacturing process comprising:
preparing a curable coating-agent composition containing:
Component (A) in an amount of from 20 to 80 parts by mass;
Component (B) in an amount of from 10 to 70 parts by mass;
Component (C) in an amount of from 1 to 35 parts by mass;
a radical-polymerization initiator as Component (D) in an amount of from 0.1 to 10 parts by mass;
an ultraviolet absorber as Component (E) in an amount of from 1 to 12 parts by mass; and
an organic solvent as Component (F) in an amount of from 10 to 1,000 parts by mass;
with respect to a sum of the Component (A), the Component (B) and the Component (C) being taken as 100 parts by mass;
applying said curable coating-agent composition onto at least a part of a surface of a resinous substrate; and
curing said curable coating-agent composition, thereby forming a protective film on the surface of said resinous substrate:
wherein Component (A) is an isocyanuric ring-containing urethane (meth)acrylate compound being expressed by the following Formula (1):

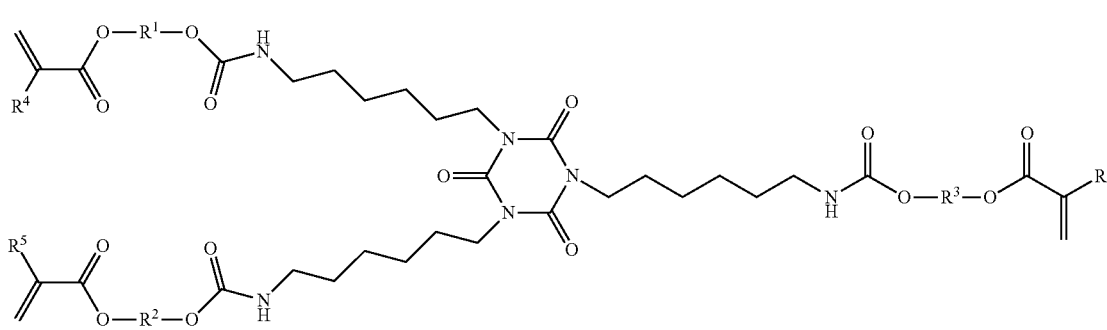

(1)

in Formula (1), each of $R^1$, $R^2$ and $R^3$ is a divalent organic group whose number of carbon atoms is from 2 to 10 independently; and each of $R^4$, $R^5$ and $R^6$ is a hydrogen atom, or a methyl group independently;

wherein Component (B) is an isocyanuric ring-containing tri(meth)acrylate compound being free from any urethane bond that is expressed by the following Formula (2):

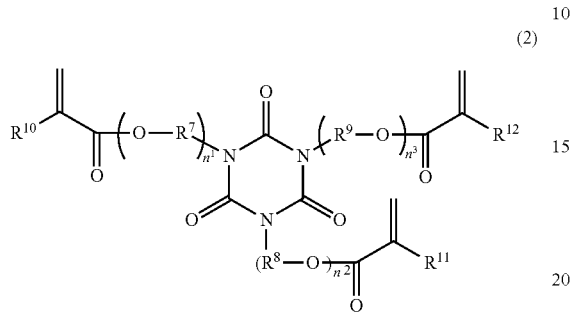

(2)

in Formula (2), each of $R^7$, $R^8$ and $R^9$ is a divalent organic group whose number of carbon atoms is from 2 to 10 independently; each of $R^{10}$, $R^{11}$ and $R^{12}$ is a hydrogen atom, or a methyl group independently; each of $n^1$, $n^2$ and $n^3$ is a number of from 1 to 3 independently; and $n^1+n^2+n^3$=from 3 to 9; and wherein Component (C) is an involatile component formed by reacting an alkoxysilane compound (c1) having Formula (3), with a colloidal silica (c2), wherein a mass ratio of (c1) to (c2) is from 9:1 to 1:9:

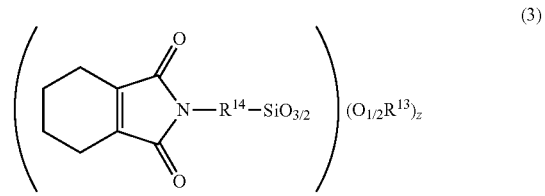

(3)

in Formula (3), each $R^{13}$ is independently a hydrogen atom, or a monovalent organic group; $R^{14}$ is a divalent hydrocarbon whose number of carbon atoms is from 1 to 6; and "z" is a positive number of from 0.1 to 3; wherein, when "z" is less than 3, the alkoxysilane compound (c1) is a condensate.

* * * * *